(12) United States Patent
Deng et al.

(10) Patent No.: US 12,096,134 B2
(45) Date of Patent: Sep. 17, 2024

(54) BIG APERTURE BLURRING METHOD BASED ON DUAL CAMERAS AND TOF

(71) Applicant: HUAWEI TECHNOLOGIES CO., LTD., Guangdong (CN)

(72) Inventors: Xijia Deng, Shenzhen (CN); Yuanwen Liu, Tampere (FI)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 218 days.

(21) Appl. No.: 17/484,093

(22) Filed: Sep. 24, 2021

(65) Prior Publication Data

US 2022/0086360 A1 Mar. 17, 2022

Related U.S. Application Data

(63) Continuation of application No. PCT/CN2019/127944, filed on Dec. 24, 2019.

(30) Foreign Application Priority Data

Mar. 25, 2019 (CN) .......................... 201910229288.2
Apr. 23, 2019 (CN) .......................... 201910330861.9
Aug. 14, 2019 (CN) .......................... 201910749592.X

(51) Int. Cl.
*H04N 23/959* (2023.01)
*G06N 3/045* (2023.01)
(Continued)

(52) U.S. Cl.
CPC ........... *H04N 23/959* (2023.01); *G06N 3/045* (2023.01); *G06T 5/50* (2013.01); *G06T 5/70* (2024.01); *H04N 23/635* (2023.01)

(58) Field of Classification Search
CPC .. H04N 23/959; H04N 23/635; H04N 5/2621; H04N 23/45; H04N 23/671;
(Continued)

(56) References Cited

U.S. PATENT DOCUMENTS

2014/0112574 A1 4/2014 Kim et al.
2018/0096489 A1* 4/2018 Cohen .................. G01S 17/894
(Continued)

FOREIGN PATENT DOCUMENTS

CN 105869167 A 8/2016
CN 106772431 A 5/2017
(Continued)

OTHER PUBLICATIONS

ITU-T H.264(Apr. 2017), Series H: Audiovisual and Multimedia Systems, Infrastructure of audiovisual services-Coding of moving video, Advanced video coding for generic audiovisual services, total 812 pages.
(Continued)

*Primary Examiner* — Padma Haliyur
(74) *Attorney, Agent, or Firm* — WOMBLE BOND DICKINSON (US) LLP

(57) ABSTRACT

This application provides an image processing method, including: after binocular image data of a photographing scene that is generated by dual cameras is obtained, determining binocular depth data by using the binocular image data, to determine an error region in an image, correcting depths of the error region based on time of flight (TOF) data corresponding to the scene, and finally performing blurring processing on monocular image data in the binocular image data by using corrected binocular depth data. Because TOF is considered when the depths of the error region are corrected, the method can effectively avoid a depth estimation error caused by relatively poor precision and stability of a binocular depth estimation manner, so that depth estimation precision and stability are improved.

16 Claims, 18 Drawing Sheets

(51) Int. Cl.
*G06T 5/50* (2006.01)
*G06T 5/70* (2024.01)
*H04N 23/63* (2023.01)

(58) Field of Classification Search
CPC ......... H04N 2013/0081; H04N 13/239; H04N 13/128; H04N 13/271; G06N 3/045; G06T 5/002; G06T 5/50; G06T 7/593; G06T 2207/10012; G06T 2207/10024; G06T 2207/10028; G06T 2207/20081; G06T 2207/20084; G06T 2207/20221; G06T 2207/30201; G01S 17/08
See application file for complete search history.

(56) References Cited

U.S. PATENT DOCUMENTS

| | | | |
|---|---|---|---|
| 2019/0122378 A1* | 4/2019 | Aswin | G06N 3/045 |
| 2019/0197717 A1* | 6/2019 | Cho | G06T 7/11 |
| 2019/0289281 A1* | 9/2019 | Badrinarayanan | H04N 23/90 |
| 2019/0325564 A1 | 10/2019 | Yan et al. | |
| 2020/0145642 A1* | 5/2020 | Yu | G06T 5/50 |
| 2020/0226419 A1* | 7/2020 | Knaan | G06T 7/593 |
| 2020/0410699 A1* | 12/2020 | Badrinarayanan | G06T 5/50 |
| 2021/0264626 A1* | 8/2021 | Liu | G06T 7/13 |

FOREIGN PATENT DOCUMENTS

| | | |
|---|---|---|
| CN | 106993112 A | 7/2017 |
| CN | 108234858 A | 6/2018 |
| CN | 109040556 A | 12/2018 |
| CN | 109274957 A | 1/2019 |
| CN | 109615652 A | 4/2019 |
| EP | 2890125 A1 | 7/2015 |
| WO | 2017063435 A1 | 4/2017 |

OTHER PUBLICATIONS

WG11 (MPEG), MPEG-4 Overview—(V.21 Jeju Version), ISO/IEC JTC1/SC29/WG11 N4668, Mar. 2002, total 77 pages.

* cited by examiner

BIG APERTURE BLURRING METHOD BASED ON DUAL CAMERAS AND TOF

CROSS-REFERENCE TO RELATED APPLICATIONS

This application is a continuation of International Application No. PCT/CN2019/127944, filed on Dec. 24, 2019, which claims priority to Chinese Patent Application No. 201910229288.2, filed on Mar. 25, 2019, Chinese Patent Application No. 201910330861.9, filed on Apr. 23, 2019 and Chinese Patent Application No. 201910749592.X, filed on Aug. 14, 2019. All of the aforementioned patent applications are hereby incorporated by reference in their entireties.

TECHNICAL FIELD

This application relates to the field of image processing, and specifically, to an image processing method and apparatus.

BACKGROUND

A big aperture blurring effect is a special photographing effect, and a starting point of the effect is to simulate an effect of a single-lens reflex camera. The single-lens reflex camera can keep a focused object clear and a non-focused object blurred, to make the focused object more prominent. In an image with a big aperture blurring effect, a target object and an object with depths that are the same as or close to depths of the target object remain clear, and other objects are blurred.

Depths of an object in a collected image may be determined by using a binocular system. A depth map determined by using the binocular system has a relatively large quantity of pixels and high resolution. In addition, the binocular system is consistent with the sense of human eyes, and has a wider application scope. However, precision and stability of the depth map determined by using the binocular system are relatively poor.

To implement the big aperture blurring effect, the binocular system may be used to determine depths of an object to perform blurring processing. However, a blurring error may be caused by a limitation of precision and stability of a depth estimation result of the binocular system.

SUMMARY

This application provides an image processing method. By using the method, a problem of a blurring error that may be caused when a binocular system determines depths of an object to perform blurring processing can be resolved. Depth data determined based on the binocular system is corrected based on time of flight (TOF) data, to reduce or even eliminate a blurring error in an image with a big aperture blurring effect.

According to a first aspect, an image processing method is provided, including: obtaining binocular image data of a scene and TOF data of the scene, where the binocular image data includes first image data and second image data that are obtained by different cameras; determining an error region based on the binocular image data and binocular depth data, where the binocular depth data is determined based on the binocular image data; correcting depths of the error region based on the TOF data, to determine corrected binocular depth data; and performing blurring processing on the first image data based on the corrected binocular depth data, where the first image data is to-be-displayed image data.

By using the method, the error region may be corrected based on the TOF data, to effectively avoid a depth estimation error of some specific regions that is caused by relatively poor precision and stability of a binocular depth estimation manner. Advantages of the TOF data in precision and stability and a characteristic of high resolution of a binocular image are used together to implement a precise, stable, and high-resolution depth estimation, so that a blurring error in an image with a big aperture blurring effect is reduced or even eliminated.

In an embodiment, the operation of determining an error region based on the binocular image data and binocular depth data includes: determining, based on the binocular depth data and the first image data or the second image data, a region that is of the first image data and that corresponds to a region, in the binocular depth data, whose at least one of precision or stability does not fall within a preset range.

In an embodiment, the error region includes a first error region, and the binocular depth data includes binocular dense depth data; the determining, based on the binocular depth data and the first image data or the second image data, a region that is of the first image data and that corresponds to a region, in the binocular depth data, whose at least one of precision or stability does not fall within a preset range includes: determining the first error region based on the binocular dense depth data and the first image data; and the correcting depths of the error region based on the TOF data, to determine corrected binocular depth data of the preset scene includes: correcting depths of the first error region in the binocular dense depth data based on the TOF data, to determine the corrected binocular depth data.

In an embodiment, the correcting depths of the first error region in the binocular dense depth data based on the TOF data, to determine the corrected binocular depth data includes: using, as the depths of the first error region, depths that are of the first error region and that correspond to the TOF data; performing densification processing on the depths of the first error region; and using, as corresponding depths of a region other than the first error region, depths that are of the region other than the first error region and that correspond to the binocular dense depth data, to obtain the corrected binocular depth data.

In an embodiment, the error region includes a first error region and a second error region, and the binocular depth data includes binocular dense depth data; the determining an error region based on the binocular image data and binocular depth data and the correcting depths of the error region based on the TOF data, to determine corrected binocular depth data include: determining the first error region based on the binocular dense depth data and the first image data; correcting depths of the first error region in the binocular dense depth data based on the TOF data, to determine first corrected dense depth data; determining the second error region based on the first corrected dense depth data, the TOF data, and the first image data; and correcting depths of the second error region in the first corrected dense depth data based on the TOF data, to determine the corrected binocular depth data.

In an embodiment, the correcting depths of the first error region in the binocular dense depth data based on the TOF data, to determine first corrected dense depth data includes: using, as the depths of the first error region, depths that are of the first error region and that correspond to the TOF data; performing densification processing on the depths of the first error region; and using, as corresponding depths of a region other than the first error region, depths that are of the region other than the first error region and that correspond to the binocular dense depth data, to obtain the first corrected dense depth data.

In an embodiment, the error region includes a first error region, and the binocular depth data includes binocular sparse depth data; the determining an error region based on the binocular image data and binocular depth data includes: determining the first error region based on the binocular sparse depth data, the first image data, and the second image data; and the correcting depths of the error region based on the TOF data and the binocular depth data, to determine corrected binocular depth data includes: correcting depths of the first error region based on the TOF data and the binocular sparse depth data, to determine the corrected binocular depth data.

In an embodiment, the correcting depths of the first error region in the binocular sparse depth data based on the TOF data, to determine the corrected binocular depth data includes: using, as the depths of the first error region, depths that are of the first error region and that correspond to the TOF data; using, as corresponding depths of a region other than the first error region, depths that are of the region other than the first error region and that correspond to the binocular sparse depth data; and performing densification processing on the depths of the first error region and the region other than the first error region, to obtain the corrected binocular depth data.

In an embodiment, the error region includes a first error region and a second error region, and the binocular depth data includes binocular sparse depth data; the determining an error region based on the binocular image data and binocular depth data and the correcting depths of the error region based on the TOF data and the binocular depth data, to determine corrected binocular depth data include: determining the first error region based on the binocular sparse depth data, the first image data, and the second image data; correcting depths of the first error region based on the TOF data and the binocular sparse depth data, to determine first corrected dense depth data; determining the second error region based on the first corrected dense depth data, the TOF data, and the first image data; and correcting depths of the second error region based on the TOF data and the first corrected dense depth data, to determine the corrected binocular depth data.

In an embodiment, the correcting depths of the first error region in the binocular sparse depth data based on the TOF data, to determine first corrected dense depth data includes: using, as the depths of the first error region, depths that are of the first error region and that correspond to the TOF data; using, as corresponding depths of a region other than the first error region, depths that are of the region other than the first error region and that correspond to the binocular sparse depth data; and performing densification processing on the depths of the first error region and the region other than the first error region, to obtain the first corrected dense depth data.

In an embodiment, the correcting depths of the second error region in the first corrected dense depth data based on the TOF data, to determine the corrected binocular depth data includes: using, as the depths of the second error region, depths that are of the second error region and that correspond to the TOF data; performing densification processing on the depths of the second error region; and using, as corresponding depths of a region other than the second error region, depths that are of the region other than the second error region and that correspond to the first corrected dense depth data, to obtain the corrected binocular depth data.

In an embodiment, the second error region includes a depth jumping region in the first corrected dense depth data.

In an embodiment, the first error region includes at least one of the following regions: a repeated texture region, a region whose color difference is less than a first preset value, or a depth gradient region.

In an embodiment, before the correcting depths of the error region based on the TOF data, to determine corrected binocular depth data, the method further includes: adjusting depths of the TOF data and/or the binocular depth data, so that a system depth error between the TOF data and the binocular data is less than a second preset value.

In an embodiment, before the correcting depths of the error region based on the TOF data, to determine corrected binocular depth data, the method further includes: adjusting relative locations or a relative location of the TOF data and/or the binocular depth data, so that a system location error between the TOF data and the binocular data is less than a third preset value.

According to a second aspect, an image processing apparatus is provided, including: an obtaining module, configured to obtain binocular image data of a scene and time of flight (TOF) data of the scene, where the binocular image data includes first image data and second image data; a determining module, configured to determine an error region based on the binocular image data and binocular depth data, where the binocular depth data is determined based on the binocular image data; a correction module, configured to correct depths of the error region based on the TOF data, to determine corrected binocular depth data; and a blurring processing module, configured to perform blurring processing on the first image data based on the corrected binocular depth data.

In an embodiment, the error region includes a first error region, and the binocular depth data includes binocular dense depth data; the determining module is configured to determine the first error region based on the binocular dense depth data and the first image data; and the correction module is configured to correct depths of the first error region based on the TOF data and the binocular dense depth data, to determine the corrected binocular depth data.

In an embodiment, the correction module is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the corrected binocular depth data.

In an embodiment, the error region includes a first error region and a second error region, and the binocular depth data includes binocular dense depth data; the determining module is configured to determine the first error region based on the binocular dense depth data and the first image data; the correction module is configured to correct depths of the first error region based on the TOF data and the binocular dense depth data, to determine first corrected dense depth data; the determining module is further configured to determine the second error region based on the first corrected dense depth data, the TOF data, and the first image data; and the correction module is further configured to correct depths of the second error region based on the TOF data and the first corrected dense depth data, to determine the corrected binocular depth data.

In an embodiment, the correction module is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the first corrected dense depth data.

In an embodiment, the error region includes a first error region, and the binocular depth data includes binocular sparse depth data; the determining module is configured to determine the first error region based on the binocular sparse depth data, the first image data, and the second image data; and the correction module is configured to correct depths of the first error region based on the TOF data and the binocular sparse depth data, to determine the corrected binocular depth data.

In an embodiment, the correction module is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the corrected binocular depth data.

In an embodiment, the error region includes a first error region and a second error region, and the binocular depth data includes binocular sparse depth data; the determining module is configured to determine the first error region based on the binocular sparse depth data, the first image data, and the second image data; the correction module is configured to correct depths of the first error region based on the TOF data and the binocular sparse depth data, to determine first corrected dense depth data; the determining module is further configured to determine the second error region based on the first corrected dense depth data, the TOF data, and the first image data; and the correction module is further configured to correct depths of the second error region based on the TOF data and the first corrected dense depth data, to determine the corrected binocular depth data.

In an embodiment, the correction module is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the first corrected dense depth data.

In an embodiment, the correction module is configured to: use, as the depths of the second error region, depths that are of the second error region and that correspond to the TOF data; perform densification processing on the depths of the second error region; and use, as corresponding depths of a region other than the second error region, depths that are of the region other than the second error region and that correspond to the first corrected dense depth data, to obtain the corrected binocular depth data.

In an embodiment, the second error region includes a depth jumping region in the first corrected dense depth data.

In an embodiment, the first error region includes at least one of the following regions: a repeated texture region, a region whose color difference is less than a first preset value, or a depth gradient region.

In an embodiment, the image processing apparatus further includes a first adjustment module, configured to: before the depths of the error region are corrected based on the TOF data, to determine the corrected binocular depth data, adjust depths of the TOF data and/or the binocular depth data, so that a system depth error between the TOF data and the binocular data is less than a second preset value.

In an embodiment, the image processing apparatus further includes a second adjustment module, configured to: before the depths of the error region are corrected based on the TOF data, to determine the corrected binocular depth data, adjust relative locations or a relative location of the TOF data and/or the binocular depth data, so that a system location error between the TOF data and the binocular data is less than a third preset value.

According to a third aspect, an image processing method is provided, including: obtaining binocular image data of a scene and time of flight (TOF) data of the scene, where the binocular image data includes first image data and second image data that are obtained by different cameras; correcting binocular depth data based on the TOF data, to obtain corrected binocular depth data, where the binocular depth data is determined based on the binocular image data; and performing blurring processing on the first image data based on the corrected binocular depth data, where the first image data is to-be-displayed image data.

By using the method, an error region may be corrected based on the TOF data, to effectively avoid a depth estimation error of some specific regions that is caused by relatively poor precision and stability of a binocular depth estimation manner. Advantages of the TOF data in precision and stability and a characteristic of high resolution of a binocular image are used together to implement a precise, stable, and high-resolution depth estimation, so that a blurring error in an image with a big aperture blurring effect is reduced or even eliminated.

In an embodiment, the correcting binocular depth data based on the TOF data, to obtain corrected binocular depth data includes: determining an error region based on the binocular image data and binocular depth data; and correcting depths of the error region based on the TOF data, to determine the corrected binocular depth data.

In an embodiment, the operation of determining an error region based on the binocular image data and binocular depth data includes: determining, based on the binocular depth data and the first image data or the second image data, a region that is of the first image data and that corresponds to a region, in the binocular depth data, whose at least one of precision or stability does not fall within a preset range.

In an embodiment, the error region includes a first error region, and the binocular depth data includes binocular dense depth data; the determining, based on the binocular depth data and the first image data or the second image data, a region that is of the first image data and that corresponds to a region, in the binocular depth data, whose at least one of precision or stability does not fall within a preset range includes: determining the first error region based on the binocular dense depth data and the first image data, where the first error region is a region that is of the first image data and that corresponds to a region, in the binocular depth data, whose at least one of precision or stability does not fall within a preset range; and the correcting depths of the error region based on the TOF data, to determine the corrected binocular depth data includes: correcting depths of the first error region in the binocular dense depth data based on the TOF data, to determine the corrected binocular depth data.

In an embodiment, the correcting depths of the first error region in the binocular dense depth data based on the TOF data, to determine the corrected binocular depth data includes: using, as the depths of the first error region, depths that are of the first error region and that correspond to the TOF data; performing densification processing on the depths of the first error region; and using, as corresponding depths of a region other than the first error region, depths that are of the region other than the first error region and that correspond to the binocular dense depth data, to obtain the corrected binocular depth data.

In an embodiment, the error region includes a first error region and a second error region; the second error region includes a part of regions other than the first error region, and the binocular depth data includes binocular dense depth data; the determining, based on the binocular depth data and the first image data or the second image data, a region that is of the first image data and that corresponds to a region, in the binocular depth data, whose at least one of precision or stability does not fall within a preset range includes: determining the first error region based on the binocular dense depth data and the first image data, where the first error region is a region that is of the first image data and that corresponds to a region, in the binocular depth data, whose at least one of precision or stability does not fall within a preset range; and the correcting depths of the error region based on the TOF data, to determine the corrected binocular depth data includes: correcting depths of the first error region in the binocular dense depth data based on the TOF data, to determine first corrected dense depth data; determining the second error region based on the first corrected dense depth data, the TOF data, and the first image data, where the second error region is a region that is of the first image data and that corresponds to a region, in the binocular depth data, whose at least one of precision or stability does not fall within a preset range; and correcting depths of the second error region in the first corrected dense depth data based on the TOF data, to determine the corrected binocular depth data.

In an embodiment, the correcting depths of the first error region in the binocular dense depth data based on the TOF data, to determine first corrected dense depth data includes: using, as the depths of the first error region, depths that are of the first error region and that correspond to the TOF data; performing densification processing on the depths of the first error region; and using, as corresponding depths of a region other than the first error region, depths that are of the region other than the first error region and that correspond to the binocular dense depth data, to obtain the first corrected dense depth data.

In an embodiment, the error region includes a first error region, and the binocular depth data includes binocular sparse depth data; the determining, based on the binocular depth data and the first image data or the second image data, a region that is of the first image data and that corresponds to a region, in the binocular depth data, whose at least one of precision or stability does not fall within a preset range includes: determining the first error region based on the binocular sparse depth data, the first image data, and the second image data, where the first error region is a region that is of the first image data and that corresponds to a region, in the binocular depth data, whose at least one of precision or stability does not fall within a preset range; and the correcting depths of the error region based on the TOF data, to determine the corrected binocular depth data includes: correcting depths of the first error region in the binocular sparse depth data based on the TOF data, to determine the corrected binocular depth data.

In an embodiment, the correcting depths of the first error region in the binocular sparse depth data based on the TOF data, to determine the corrected binocular depth data includes: using, as the depths of the first error region, depths that are of the first error region and that correspond to the TOF data; using, as corresponding depths of a region other than the first error region, depths that are of the region other than the first error region and that correspond to the binocular sparse depth data; and performing densification processing on the depths of the first error region and the region other than the first error region, to obtain the corrected binocular depth data.

In an embodiment, the error region includes a first error region and a second error region, the second error region includes a part of regions other than the first error region, and the binocular depth data includes binocular sparse depth data; the determining, based on the binocular depth data and the first image data or the second image data, a region that is of the first image data and that corresponds to a region, in the binocular depth data, whose at least one of precision or stability does not fall within a preset range includes: determining the first error region based on the binocular sparse depth data, the first image data, and the second image data, where the first error region is a region that is of the first image data and that corresponds to a region, in the binocular depth data, whose at least one of precision or stability does not fall within a preset range; and the correcting depths of the error region based on the TOF data, to determine the corrected binocular depth data includes: correcting depths of the first error region in the binocular sparse depth data based on the TOF data, to determine first corrected dense depth data; determining the second error region based on the first corrected dense depth data, the TOF data, and the first image data, where the second error region is a region that is of the first image data and that corresponds to a region, in the binocular depth data, whose at least one of precision or stability does not fall within a preset range; and correcting depths of the second error region based on the TOF data and the first corrected dense depth data, to determine the corrected binocular depth data.

In an embodiment, the correcting depths of the first error region in the binocular sparse depth data based on the TOF data, to determine first corrected dense depth data includes: using, as the depths of the first error region, depths that are of the first error region and that correspond to the TOF data; using, as corresponding depths of a region other than the first error region, depths that are of the region other than the first error region and that correspond to the binocular sparse depth data; and performing densification processing on the depths of the first error region and the region other than the first error region, to obtain the first corrected dense depth data.

In an embodiment, the correcting depths of the second error region in the first corrected dense depth data based on the TOF data, to determine the corrected binocular depth data includes: using, as the depths of the second error region, depths that are of the second error region and that correspond to the TOF data; performing densification processing on the depths of the second error region; and using, as corresponding depths of a region other than the second error region, depths that are of the region other than the second error region and that correspond to the first corrected dense depth data, to obtain the corrected binocular depth data.

In an embodiment, the second error region includes a depth jumping region in the first corrected dense depth data.

In an embodiment, the first error region includes at least one of the following regions: a repeated texture region, a region whose color difference is less than a first preset value, or a depth gradient region.

In an embodiment, before the correcting depths of the error region based on the TOF data, to determine the corrected binocular depth data, the method further includes: adjusting depths of the TOF data and/or the binocular depth data, so that a system depth error between the TOF data and the binocular data is less than a second preset value.

In an embodiment, before the correcting depths of the error region based on the TOF data, to determine the corrected binocular depth data, the method further includes: adjusting relative locations or a relative location of the TOF data and/or the binocular depth data, so that a system location error between the TOF data and the binocular data is less than a third preset value.

According to a fourth aspect, an image processing apparatus is provided, including: an obtaining module, configured to obtain binocular image data of a scene and time of flight (TOF) data of the scene, where the binocular image data includes first image data and second image data that are obtained by different cameras; a correction module, configured to correct binocular depth data based on the TOF data, to obtain corrected binocular depth data, where the binocular depth data is determined based on the binocular image data; and a blurring processing module, configured to perform blurring processing on the first image data based on the corrected binocular depth data, where the first image data is to-be-displayed image data.

In an embodiment, the correction module includes: a determining unit, configured to determine an error region based on the binocular image data and the binocular depth data; and a correction unit, configured to correct depths of the error region based on the TOF data, to determine the corrected binocular depth data.

In an embodiment, the determining unit is configured to determine, based on the binocular depth data and the first image data or the second image data, a region that is of the first image data and that corresponds to a region, in the binocular depth data, whose at least one of precision or stability does not fall within a preset range.

In an embodiment, the error region includes a first error region, and the binocular depth data includes binocular dense depth data; the determining unit is configured to determine the first error region based on the binocular dense depth data and the first image data, where the first error region is a region that is of the first image data and that corresponds to a region, in the binocular depth data, whose at least one of precision or stability does not fall within a preset range; and the correction unit is configured to correct depths of the first error region in the binocular dense depth data based on the TOF data, to determine the corrected binocular depth data.

In an embodiment, the correction unit is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the corrected binocular depth data.

In an embodiment, the error region includes a first error region and a second error region, the second error region includes a part of regions other than the first error region, and the binocular depth data includes binocular dense depth data; the determining unit is configured to determine the first error region based on the binocular dense depth data and the first image data, where the first error region is a region that is of the first image data and that corresponds to a region, in the binocular depth data, whose at least one of precision or stability does not fall within a preset range; the correction unit is configured to correct depths of the first error region in the binocular dense depth data based on the TOF data, to determine first corrected dense depth data; the determining unit is further configured to determine the second error region based on the first corrected dense depth data, the TOF data, and the first image data, where the second error region is a region that is of the first image data and that corresponds to a region, in the binocular depth data, whose at least one of precision or stability does not fall within a preset range; and the correction unit is further configured to correct depths of the second error region in the first corrected dense depth data based on the TOF data, to determine the corrected binocular depth data.

In an embodiment, the correction unit is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the first corrected dense depth data.

In an embodiment, the error region includes a first error region, and the binocular depth data includes binocular sparse depth data; the determining unit is configured to determine the first error region based on the binocular sparse depth data, the first image data, and the second image data, where the first error region is a region that is of the first image data and that corresponds to a region, in the binocular depth data, whose at least one of precision or stability does not fall within a preset range; and the correction unit is configured to correct depths of the first error region in the binocular sparse depth data based on the TOF data, to determine the corrected binocular depth data.

In an embodiment, the correction unit is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the corrected binocular depth data.

In an embodiment, the error region includes a first error region and a second error region, the second error region includes a part of regions other than the first error region, and the binocular depth data includes binocular sparse depth data; the determining unit is configured to determine the first error region based on the binocular sparse depth data, the first image data, and the second image data, where the first error region is a region that is of the first image data and that corresponds to a region, in the binocular depth data, whose at least one of precision or stability does not fall within a preset range; the correction unit is configured to correct depths of the first error region in the binocular sparse depth data based on the TOF data, to determine first corrected dense depth data; the determining unit is further configured to determine the second error region based on the first corrected dense depth data, the TOF data, and the first image data, where the second error region is a region that is of the first image data and that corresponds to a region, in the binocular depth data, whose at least one of precision or stability does not fall within a preset range; and the correction unit is further configured to correct depths of the second error region in the first corrected dense depth data based on the TOF data, to determine the corrected binocular depth data.

In an embodiment, the correction unit is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the first corrected dense depth data.

In an embodiment, the correction unit is configured to: use, as the depths of the second error region, depths that are of the second error region and that correspond to the TOF data; perform densification processing on the depths of the second error region; and use, as corresponding depths of a region other than the second error region, depths that are of the region other than the second error region and that correspond to the first corrected dense depth data, to obtain the corrected binocular depth data.

In an embodiment, the second error region includes a depth jumping region in the first corrected dense depth data.

In an embodiment, the first error region includes at least one of the following regions: a repeated texture region, a region whose color difference is less than a first preset value, or a depth gradient region.

In an embodiment, the apparatus further includes a first adjustment module, configured to: before the depths of the error region are corrected based on the TOF data, to determine the corrected binocular depth data, adjust depths of the TOF data and/or the binocular depth data, so that a system depth error between the TOF data and the binocular data is less than a second preset value.

In an embodiment, the apparatus further includes a second adjustment module, configured to: before the depths of the error region are corrected based on the TOF data, to determine the corrected binocular depth data, adjust relative locations or a relative location of the TOF data and/or the binocular depth data, so that a system location error between the TOF data and the binocular data is less than a third preset value.

According to a fifth aspect, an image processing apparatus is provided, including: a memory, configured to store code; and a processor, configured to read code in the memory to perform the method in the first aspect or the third aspect and the possible implementations of the first aspect or the third aspect.

According to a sixth aspect, a computer program storage medium is provided, where the computer program storage medium includes program instructions, and when the program instructions are executed, the method in the first aspect or the third aspect and the possible implementations of the first aspect or the third aspect is performed.

According to a seventh aspect, a terminal device is provided, where the chip includes: a binocular system, configured to collect binocular image data; a time of flight (TOF) component, configured to collect TOF data; and at least one processor, where when program instructions are executed by the at least one processor, the method in the first aspect or the third aspect and the possible implementations of the first aspect or the third aspect is performed.

According to an eighth aspect, a terminal device is provided, including the apparatus in the second aspect or the fourth aspect and the possible implementations of the second aspect or the fourth aspect.

DESCRIPTION OF EMBODIMENTS

The following clearly and completely describes the technical solutions in the embodiments of the present application with reference to the accompanying drawings in the embodiments of the present application. Clearly, the described embodiments are merely some but not all of the embodiments of the present application. All other embodiments obtained by a person of ordinary skill in the art based on the embodiments of the present application without creative efforts shall fall within the protection scope of this application.

Big aperture blurring is a feature of an image collection unit. A big aperture blurring effect is a special photographing effect. After a user selects a target object, the target object and an object with a same attribute (for example, a same depth level) as the target object remain clear, and other objects are blurred. A starting point of the effect is to simulate an effect of a single-lens reflex camera, to keep a focused object clear and a non-focused object blurred.

Currently, most intelligent terminal devices on the market have a feature effect of big aperture blurring, and the effect is mainly implemented based on a binocular system (dual camera). The binocular system includes two image collection units. During scene capturing, the two image collection units collect images at the same time.

Figure 1:
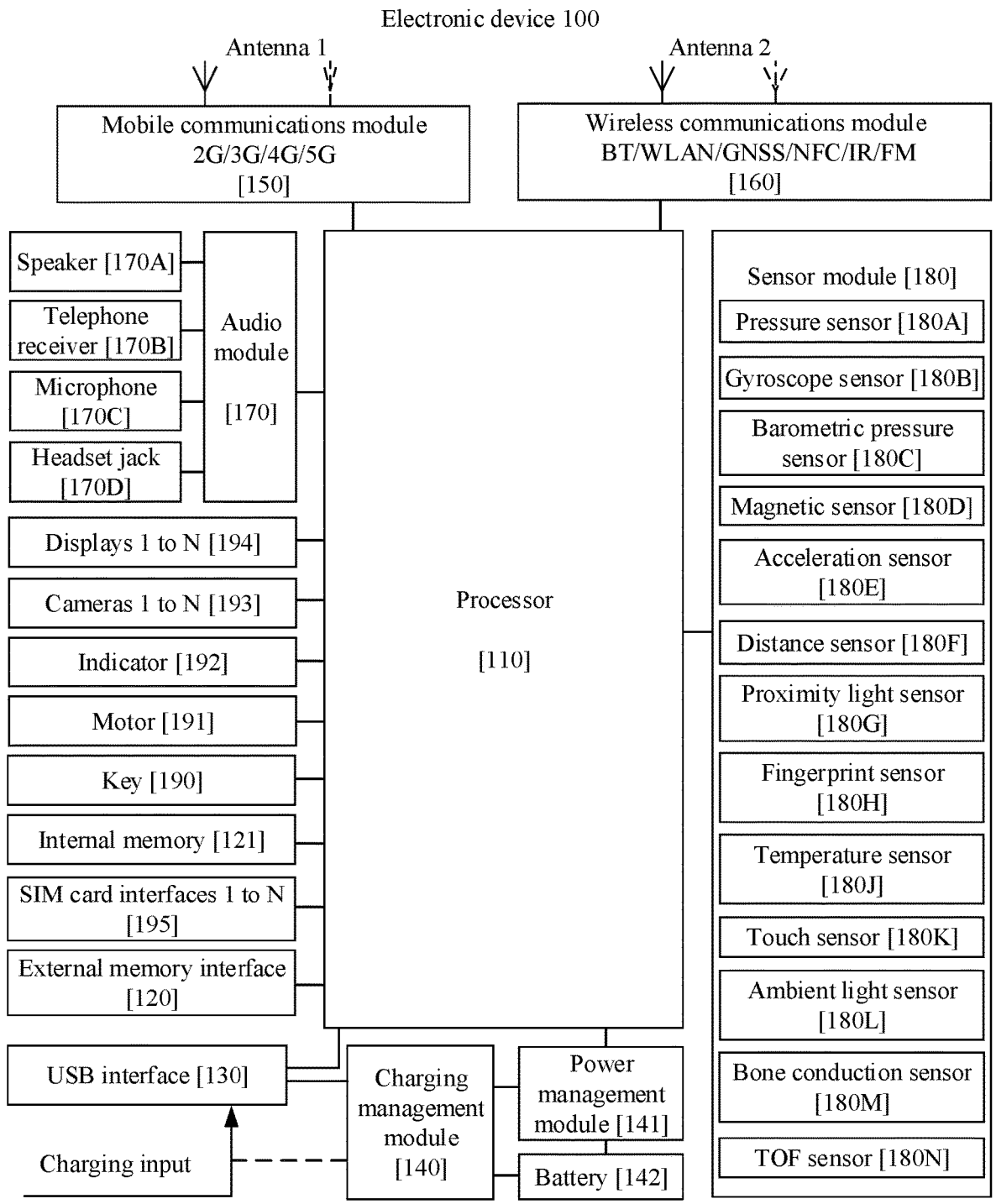
FIG. 1 is a schematic structural diagram of a terminal device.

FIG. 1 is a schematic structural diagram of an electronic device 100. The electronic device 110 may be a terminal device.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, a time of flight (TOF) sensor 180N, and the like.

It may be understood that the structure illustrated in this embodiment of the present application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (image signal processor, ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a timing signal, to complete instruction fetching and instruction execution control.

A memory may be further disposed in the processor 110, and is configured to store an instruction and data. In some embodiments, the memory in the processor 110 is a cache. The memory may store an instruction or data that is just used or used cyclically by the processor 110. If the processor 110 needs to use the instruction or the data again, the processor 110 may directly invoke the instruction or the data from the memory. Therefore, repeated access is avoided, and a waiting time of the processor 110 is reduced, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, and includes one serial data line (SDL) and one serial clock line (SCL). In some embodiments, the processor 110 may include a plurality of groups of I2C buses. The processor 110 may be separately coupled to the touch sensor 180K, a charger, a flash, the camera 193, and the like by using different I2C bus interfaces. For example, the processor 110 may be coupled to the touch sensor 180K by using the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication to perform sampling, quantization, and coding of an analog signal. In some embodiments, the audio module 170 may be coupled to the wireless communications module 160 by using the PCM bus interface. In some embodiments, the audio module 170 may also transmit an audio signal to the wireless communications module 160 through the PCM interface, to implement the function of answering a call by using a Bluetooth headset. Both the I2S interface and the PCM interface can be used for audio communication.

The UART interface is a universal serial data bus, and is used for asynchronous communication. The bus may be a two-way communications bus. The UART interface converts to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be used to connect the processor 110 and a peripheral component such as the display 194 or the camera 193. The MIPI interface includes a camera serial interface (camera serial interface, CSI), a display serial interface (DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 and the camera 193, the display 194, the wireless communications module 160, the audio module 170, the sensor module 180, and the like. Alternatively, the GPIO interface may be configured as an I2C interface, an I2S interface, a UART interface, an MIPI interface, or the like.

The USB interface 130 is an interface complying with a USB standard, and may be a mini USB interface, a micro USB interface, a USB type-C interface, or the like. The USB interface 130 may be configured to connect to a charger to charge the electronic device 100, and may also be configured to transmit data between the electronic device 100 and a peripheral device. The USB interface 130 may also be configured to connect to a headset to play audio by using the headset. The interface may be further configured to connect to another electronic device such as an AR device.

It may be understood that the interface connection relationship between the modules shown in this embodiment of the present application is merely a schematic description, and does not constitute a structural limitation on the electronic device 100. In some other embodiments of this application, alternatively, the electronic device 100 may use an interface connection manner different from that in the foregoing embodiment or a combination of a plurality of interface connection manners.

The charging management module 140 is configured to receive charging input from a charger. The charger may be a wireless charger, or may be a wired charger. In some embodiments of wired charging, the charging management module 140 may receive charging input from the wired charger through the USB interface 130. In some embodiments of wireless charging, the charging management module 140 may receive wireless charging input through a wireless charging coil of the electronic device 100. When charging the battery 142, the charging management module 140 may further supply power to the electronic device by using the power management module 141.

The power management module 141 is configured to connect to the battery 142, the charging management module 140, and the processor 110. The power management module 141 receives input from the battery 142 and/or the charging management module 140, to supply power to the processor 110, the internal memory 121, the display 194, the camera 193, the wireless communications module 160, and the like. The power management module 141 may be further configured to monitor parameters such as a battery capacity, a quantity of battery cycles, and a battery health status (e.g., leakage or impedance). In some other embodiments, the power management module 141 may also be disposed in the processor 110. In some other embodiments, the power management module 141 and the charging management module 140 may also be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 may provide a solution that is applied to the electronic device 100 and that includes wireless communication such as 2G/3G/4G/5G. The mobile communications module 150 may include at least one filter, switch, power amplifier, low noise amplifier (LNA), and the like. The mobile communications module 150 may receive an electromagnetic wave by using the antenna 1, perform processing such as filtering and amplification on the received electromagnetic wave, and send an electromagnetic wave obtained after processing to the modem processor for demodulation. The mobile communications module 150 may further amplify a signal obtained after modulation by the modem processor, and convert the signal into an electromagnetic wave and radiate the electromagnetic wave by using the antenna 1. In some embodiments, at least some function modules of the mobile communications module 150 may be disposed in the processor 110. In some embodiments, at least some function modules of the mobile communications module 150 may be disposed in a same component as at least some modules of the processor 110.

The modem processor may include a modulator and a demodulator. The modulator is configured to modulate a to-be-sent low-frequency baseband signal into an intermediate-high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the telephone receiver 170B, and the like), or displays an image or a video by using the display 194. In some embodiments, the modem processor may be a stand-alone component. In some other embodiments, the modem processor may be independent of the processor 110 and disposed in a same component as the mobile communications module 150 or another function module.

The wireless communications module 160 may provide a solution that is applied to the electronic device 100 and that includes wireless communication such as a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communications module 160 may be one or more components integrated with at least one communications processing module. The wireless communications module 160 receives an electromagnetic wave by using the antenna 2, performs frequency modulation and filtering processing on the electromagnetic wave signal, and sends a signal obtained after processing to the processor 110. The wireless communications module 160 may further receive a to-be-sent signal from the processor 110, perform frequency modulation and amplification on the to-be-sent signal, and convert the signal into an electromagnetic wave and radiate the electromagnetic wave by using the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light emitting diode (AMOLED), a flexible light-emitting diode (FLED), a miniLED, a microLED, a micro-OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a camera photosensitive element by using a lens, an optical signal is converted into an electrical signal, and the camera photosensitive element transmits the electrical signal to the ISP for processing, so that the electrical signal is converted into an image visible to a naked eye. The ISP may further perform algorithm optimization on noise, brightness, and a skin color of the image. The ISP may further optimize parameters such as exposure and a color temperature of a photographing scene. In some embodiments, the ISP may be disposed in the camera 193.

The camera 193 is configured to capture a still image or a video. An optical image of an object is generated by using the lens and projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1. For example, the electronic device 100 may include a binocular system. The binocular system may include two cameras. The two cameras in the binocular system may be configured to collect image data. In other words, the two cameras in the binocular system may be configured to capture static images or videos.

The digital signal processor is configured to process a digital signal. In addition to a digital image signal, the digital signal processor may process another digital signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this case, the electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. By using a bio-neural network structure, for example, by using a transfer mode between human brain neurons, the NPU quickly processes input information, and may further constantly perform self-learning. Applications of intelligent recognition and the like of the electronic device 100, for example, image recognition, facial recognition, voice recognition, and text understanding, may be implemented by using the NPU.

The external memory interface 120 may be configured to connect to an external storage card such as a micro SD card, to extend a storage capability of the electronic device 100. The external storage card communicates with the processor 110 through the external storage interface 120, to implement a data storage function. For example, a file such as music or a video is stored in the external storage card.

The internal memory 121 may be configured to store computer executable program code. The executable program code includes an instruction. The internal memory 121 may include a program storage area and a data storage area. The program storage area may store an operating system, an application required by at least one function (for example, a voice play function or an image play function), and the like. The data storage area may store data (for example, audio data or an address book) created in a process of using the electronic device 100, and the like. In addition, the internal memory 121 may include a high-speed random access memory, or may include a non-volatile memory such as at least one magnetic disk storage component, a flash memory component, or a universal flash storage (UFS). The processor 110 executes various functional applications and data processing of the electronic device 100 by running an instruction stored in the internal memory 121 and/or an instruction stored in the memory disposed in the processor.

The electronic device 100 may implement an audio function such as music play or recording by using the audio module 170, the speaker 170A, the telephone receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 100 may listen to music or answer a hands-free call by using the speaker 170A.

The telephone receiver 170B, also referred to as an "earpiece", is configured to convert an audio electrical signal into a sound signal. When answering a call or listening to voice information, the electronic device 100 may listen to a voice by placing the telephone receiver 170B close to an ear.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to implement a noise reduction function in addition to collecting a sound signal. In some other embodiments, three, four, or more microphones 170C may be disposed in the electronic device 100, to collect a sound signal, reduce noise, identify a sound source, implement a directional recording function, and the like.

The headset jack 170D is configured to connect to a wired headset. The headset jack 170D may be the USB interface 130, a 3.5 mm open mobile terminal platform (OMTP) standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display 194. There are a plurality of types of pressure sensors 180A, for example, a resistive pressure sensor, an inductive pressure sensor, and a capacitive pressure sensor. The capacitive pressure sensor may include at least two parallel plates having conductive materials. When a force acts on the pressure sensor 180A, a capacitance between electrodes changes. The electronic device 100 determines pressure strength based on the change of the capacitance. When a touch operation is performed on the display 194, the electronic device 100 detects strength of the touch operation based on the pressure sensor 180A. The electronic device 100 may also calculate a touch location based on a detected signal of the pressure sensor 180A. In some embodiments, touch operations that are performed on a same touch location but have different touch operation strength may correspond to different operation instructions. For example, when a touch operation whose touch operation strength is less than a first pressure threshold is performed on a short message service message application icon, an instruction for viewing a short message service message is executed; or when a touch operation whose touch operation strength is greater than or equal to a first pressure threshold is performed on a short message service message application icon, an instruction for newly creating a short message service message is executed.

The gyroscope sensor 180B may be configured to determine a motion posture of the electronic device 100. In some embodiments, angular velocities of the electronic device 100 on three axes (namely, x, y, and z axes) may be determined by using the gyroscope sensor 180B. The gyroscope sensor 180B may be used for photographing stabilization. For example, when a shutter is pressed, the gyroscope sensor 180B detects a jitter angle of the electronic device 100, and calculates, based on the angle, a distance that needs to be compensated for by a lens module, so that a lens eliminates jitter of the electronic device 100 through a reverse motion, thereby implementing stabilization. The gyroscope sensor 180B may be further used for navigation and somatosensory game scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening or closing of a flip leather case by using the magnetic sensor 180D. In some embodiments, when the electronic device 100 is a flip phone, the electronic device 100 may detect opening or closing of a flip cover based on the magnetic sensor 180D. Further, a feature such as automatic unlocking in a case of flipping open is set based on a detected open/closed state of the leather case or the flip cover.

The acceleration sensor 180E may detect a value of an acceleration of the electronic device 100 in each direction (usually on three axes). When electronic device 100 is still, the acceleration sensor 180E may detect a value and a direction of gravity. The acceleration sensor 180E may be further configured to identify a terminal posture, and is applied to applications such as screen switching between landscape and portrait modes and a pedometer.

The distance sensor 180F is configured to measure a distance. The electronic device 100 may measure the distance by using infrared or a laser. In some embodiments, for a photographing scene, the electronic device 100 may measure a distance by using the distance sensor 180F, to implement fast focusing.

The proximity light sensor 180G may include, for example, a light emitting diode (LED) and an optical detector such as a photodiode. The light emitting diode may be an infrared light emitting diode. The electronic device 100 emits infrared light by using the light emitting diode. The electronic device 100 detects, by using the photodiode, reflected infrared light coming from a nearby object. When sufficient reflected light is detected, it may be determined that there is an object near the electronic device 100. When insufficient reflected light is detected, the electronic device 100 may determine that there is no object near the electronic device 100. The electronic device 100 may detect, by using the proximity light sensor 180G, that the electronic device 100 held by the user is close to an ear for a call, to automatically turn off a screen to save power. The proximity light sensor 180G may also be used in a leather case mode and a pocket mode for automatic unlocking and locking.

The ambient light sensor 180L is configured to sense ambient light luminance. The electronic device 100 may adaptively adjust luminance of the display 194 based on the sensed ambient light luminance. The ambient light sensor 180L may also be configured to automatically adjust white balance during photographing. The ambient light sensor 180L may further cooperate with the proximity light sensor 180G to detect whether the electronic device 100 is in a pocket, thereby avoiding false touch.

The fingerprint sensor 180H is configured to collect a fingerprint. The electronic device 100 may implement fingerprint unlocking, application lock access, fingerprint photographing, fingerprint-based call answering, and the like by using a collected fingerprint feature.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of the processor near the temperature sensor 180J, to reduce power consumption and implement thermal protection. In some other embodiments, when the temperature is less than another threshold, the electronic device 100 heats the battery 142 to avoid abnormal shutdown of the electronic device 100 that is caused by the low temperature. In some other embodiments, when the temperature is less than still another threshold, the electronic device 100 boosts an output voltage of the battery 142 to avoid abnormal shutdown that is caused by the low temperature.

The touch sensor 180K is also referred to as a "touch component". The touch sensor 180K may be disposed in the display 194. The touch sensor 180K and the display 194 constitute a touchscreen. The touch sensor 180K is configured to detect a touch operation performed on or near the touch sensor 180K. The touch sensor may transmit the detected touch operation to the application processor to determine a touch event type. Visual output related to the touch operation may be provided by using the display 194. In some other embodiments, alternatively, the touch sensor 180K may be disposed on a surface of the electronic device 100, and is located at a location different from that of the display 194.

The bone conduction sensor 180M may obtain a vibration signal. In some embodiments, the bone conduction sensor 180M may obtain a vibration signal of a human acoustic vibration bone block. The bone conduction sensor 180M may also come into contact with a human pulse to receive a blood pressure beat signal. In some embodiments, the bone conduction sensor 180M may also be disposed in a headset to form a bone conduction headset. The audio module 170 may obtain a voice signal through parsing based on the vibration signal that is of the acoustic vibration bone block and that is obtained by the bone conduction sensor 180M, to implement a voice function. The application processor may obtain heart rate information through parsing based on the blood pressure beat signal obtained by the bone conduction sensor 180M, to implement a heart rate detection function.

The TOF sensor 180N may include a transmit module and a receive module. The transmit module of the TOF sensor 180N may send an optical pulse, and the receive module of the TOF sensor 180N may receive light reflected by an object. A distance between the object and the TOF sensor 180N may be obtained by detecting a time of flight (a round trip time) of the optical pulse. An optical signal is reflected after an optical signal sent by the transmit module of the TOF sensor 180N encounters an object, and the receive module of the TOF sensor 180N may receive the optical signal reflected by the object. A distance of a photographed object may be calculated by calculating a time difference or a phase difference between transmitting and receiving an optical signal by the TOF sensor 180N, to generate depth information.

The key 190 includes a power-on key, a volume key, and the like. The key 190 may be a mechanical key, or may be a touch key. The electronic device 100 may receive key input to generate key signal input related to user setting and function control of the electronic device 100.

The motor 191 may generate a vibration prompt. The motor 191 may be used for a call vibration prompt, or may be used for touch vibration feedback. For example, touch operations performed on different applications (for example, photographing and audio play) may correspond to different vibration feedback effects. The motor 191 may also correspond to different vibration feedback effects when touch operations are performed on different regions of the display 194. Different application scenarios (for example, a time reminder, information receiving, an alarm clock, and a game) may also correspond to different vibration feedback effects. The touch vibration feedback effect may be further customized.

The indicator 192 may be an indicator lamp, may be configured to indicate a charging status and a power change, and may also be used to indicate a message, a missed call, a notification, and the like.

The SIM card interface 195 is configured to connect to a SIM card. The SIM card may be inserted into the SIM card interface 195 or removed from the SIM card interface 195, to implement contact with and separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195. The plurality of cards may be of a same type or different types. The SIM card interface 195 may also be compatible with different types of SIM cards. The SIM card interface 195 may also be compatible with an external storage card. The electronic device 100 interacts with a network by using the SIM card, to implement functions such as a call and data communication. In some embodiments, the electronic device 100 uses an eSIM card, namely, an embedded SIM card. The eSIM card may be embedded in the electronic device 100, and cannot be separated from the electronic device 100.

A software system of the electronic device 100 may use a hierarchical architecture, an event-driven architecture, a microkernel architecture, a microservice architecture, or a cloud architecture. In the embodiments of the present application, an Android system with a hierarchical architecture is used as an example to describe a software structure of the electronic device 100.

Figure 2:
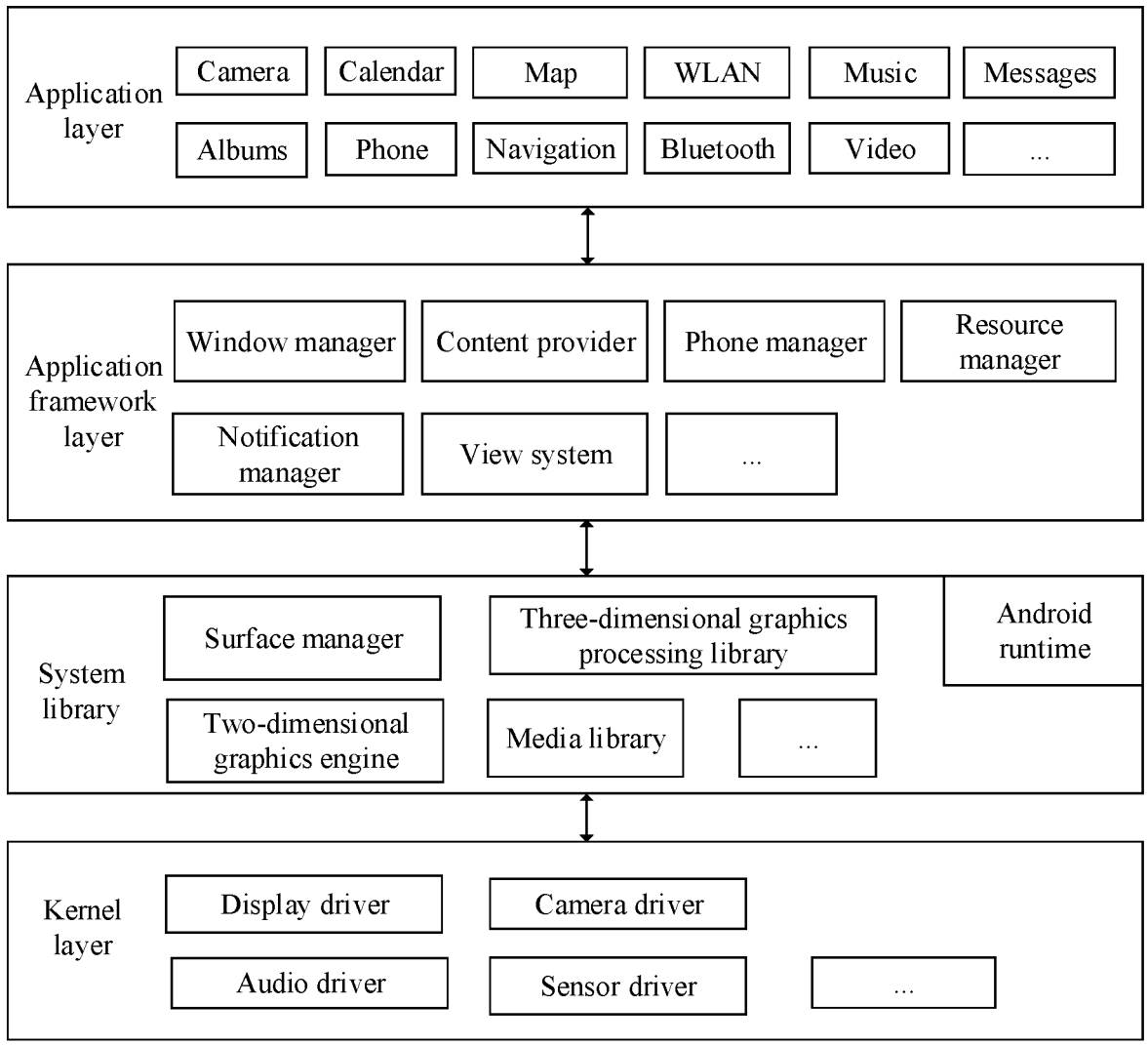
FIG. 2 is a structural block diagram of software of a terminal device.

FIG. 2 is a structural block diagram of software of the electronic device 100 according to an embodiment of this application.

In the hierarchical architecture, there are some layers of software. Each layer has a clear role and function. The layers communicate with each other through a software interface. In some embodiments, the Android system is divided into four layers from top to bottom: an application layer, an application framework layer, Android runtime (Android runtime) and a system library, and a kernel layer.

The application layer may include a series of application packages.

As shown in FIG. 2, the application packages may include applications such as Camera, Albums, Calendar, Phone, Map, Navigation, WLAN, Bluetooth, Music, Video, and Messages.

The application framework layer provides an application programming interface (API) and a programming framework for the applications in the application layer. The application framework layer includes some predefined functions.

As shown in FIG. 2, the application framework layer may include a window manager, a content provider, a view system, a phone manager, a resource manager, a notification manager, and the like.

The window manager is used to manage a window program. The window manager may obtain a screen size, determine whether there is a status bar, lock a screen, capture the screen, and the like.

The content provider is used to store and obtain data and make the data accessible to an application. The data may include a video, an image, audio, calls that are made and answered, a browsing history, a bookmark, an address book, and the like.

The view system includes visual controls such as a control for displaying a text and a control for displaying a picture. The view system may be used to build an application. A display interface may include one or more views. For example, a display interface including a short message service message notification icon may include a view for displaying a text and a view for displaying a picture.

The phone manager is used to provide a communication function of the electronic device 100, for example, call status management (including connection, hang-up, and the like).

The resource manager provides various resources such as a localized string, an icon, a picture, a layout file, and a video file for an application.

The notification manager enables an application to display notification information in a status bar, and may be used to convey a message of a notification type. The message may automatically disappear after a short stay without user interaction. For example, the notification manager is used to notify downloading completion, a message reminder, and the like. The notification manager may also be a notification that appears in a form of a chart or a scroll bar text in a status bar at the top of the system, for example, a notification of an application running in the background, or may be a notification that appears in a form of a dialog window on the screen. For example, text information is displayed in the status bar, an alert tone is made, the terminal vibrates, and an indicator lamp flashes.

The Android runtime includes a kernel library and a virtual machine. The Android runtime is responsible for scheduling and management of the Android system.

The kernel library includes two parts: a functional function to be invoked by a Java language and an Android kernel library.

The application layer and the application framework layer run in the virtual machine. The virtual machine executes Java files of the application layer and the application framework layer to obtain binary files. The virtual machine is used to perform functions such as object lifecycle management, stack management, thread management, security and abnormality management, and garbage collection.

The system library may include a plurality of function modules, for example, a surface manager, a media library, a three-dimensional graphics processing library (for example, OpenGL ES), and a 2D graphics engine (for example, an SGL).

The surface manager is used to manage a display subsystem and provide fusion of 2D and 3D layers for a plurality of applications.

The media library supports playback and recording of a plurality of commonly used audio and video formats, a still image file, and the like. The media library may support a plurality of audio and video encoding formats such as MPEG-4, H.264, MP3, AAC, AMR, JPG, and PNG.

The three-dimensional graphics processing library is used to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For example, the following describes a working procedure of software and hardware of the electronic device 100 with reference to a capturing and photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored in the kernel layer. An application framework layer obtains the original input event from the kernel layer, and identifies a control corresponding to the input event. In an example in which the touch operation is a touch tap operation, and a control corresponding to the tap operation is a control of a camera application icon, a camera application calls an interface of the application framework layer to start the camera application and further start the lens driver by calling the kernel layer, so as to capture a static image or a video by using the camera 193.

Figure 3:
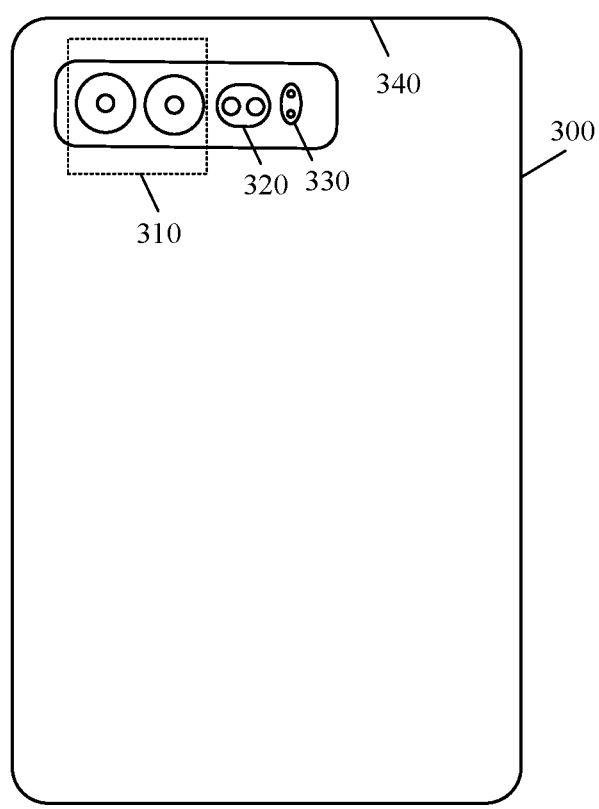
FIG. 3 is a schematic structural diagram of another terminal device.

FIG. 3 is a schematic structural diagram of a terminal device 300. For a structure of the terminal device 300, refer to FIG. 1. The terminal device 300 may include more or fewer components than the electronic device 100. A software system of the terminal device 300 may use a hierarchical architecture, an event-driven architecture, a microkernel architecture, a microservice architecture, or a cloud architecture. For the software system of the terminal device 300, refer to FIG. 2.

The terminal device 300 may a binocular system 310. The binocular system 310 may include two cameras 193, namely, a main camera and a secondary camera. The binocular system is sometimes also referred to as a dual-camera system, and the two cameras in the binocular system may be configured to collect image data. Image data collected by the two cameras may be used to implement a same function or different functions. For example, an image collected by one of the cameras may be used for image display of the terminal, and the camera may be referred to as the main camera; and an image collected by the other camera may be used to calculate depths or implement another function, and the camera may be referred to as the secondary camera. The binocular system may estimate depths of an object by using the dual cameras, and then perform blurring processing on a fully clear image based on depth information, to achieve a final big aperture blurring effect.

The terminal device 300 may include a TOF component 320. The TOF component 320 may also be referred to as a TOF system, a TOF sensor, or the like. The TOF component 320 may include a transmit module and a receive module. The transmit module of the TOF component 320 may send an optical pulse, and the receive module of the TOF component 320 may receive light reflected by an object. A distance between the object and the TOF component 320 may be obtained by detecting a time of flight (a round trip time) of the optical pulse. The distance may also be referred to as a depth.

The terminal device 300 may include a flash 330. The flash 330 is also referred to as an electronic flash and a high-speed flash. The flash 330 stores a high voltage by using a capacitor, and a flash tube discharges through triggering of a pulse, to flash instantaneously. In a dim place, a scene can be brightened by using the flash.

The terminal device 300 may further include a long-focus camera (not shown).

The binocular system 310 and the TOF component 320 may be disposed adjacent to each other. The main camera and the secondary camera may be arranged parallel to an edge 340 of the terminal device 300. The TOF component 320 may be located between the two cameras in the binocular system 310, or may be located at another location around the main camera and the secondary camera in the binocular system 310. A receiver in the TOF component 320 and the main camera may be arranged parallel to or perpendicular to the edge 340. It may be understood that, for location relationships in this embodiment of this application, "parallel" may include "approximately parallel", and "perpendicular" may include "approximately perpendicular".

The terminal device 300 may include the processor 110. The processor 110 may be configured to determine binocular dense depth data. The processor 110 may include one or more processing units. For example, the processor may include a central processing unit (CPU), a neural-network processing unit (NPU), an image signal processor (ISP), a digital signal processor (DSP), or the like. The processor may also be configured to determine binocular sparse depth data.

The terminal device 300 may include a dedicated depth map application pipeline (DMAP) chip, and the DMAP chip may be configured to determine a binocular sparse depth map. The DMAP chip may include a processor configured to determine the binocular sparse depth map.

The terminal device may also be referred to as user equipment. The terminal device may communicate with one or more core networks (CNs) through an access network device. The terminal device may also be sometimes referred to as an access terminal, a terminal, a subscriber unit, a subscriber station, a mobile station, a remote station, a remote terminal, a mobile device, a user terminal, a radio network device, a user agent or a user apparatus. The user equipment may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in the internet of things or the internet of vehicles, any form of user equipment in a future network, and the like.

Figure 4:
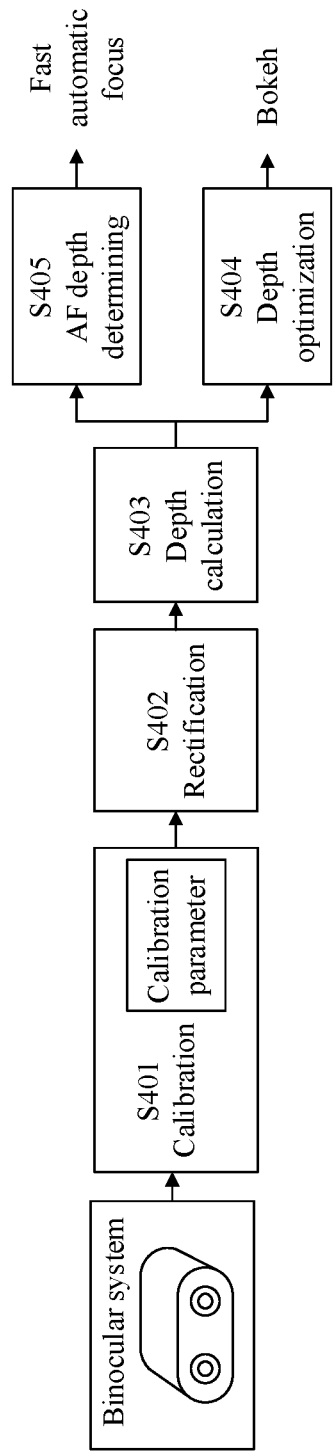
FIG. 4 is a schematic flowchart of binocular system-based depth calculation.

FIG. 4 is a schematic flowchart of binocular system-based depth calculation.

Operation S401: Obtain a calibration parameter. The calibration parameter may be an intrinsic parameter and an extrinsic parameter of a binocular system.

Operation S402: Perform image rectification on binocular image data based on the calibration parameter. An image is placed in a coordinate system, and rectification may mean changing coordinates of the image.

Operation S403: Perform depth calculation to determine binocular depth data.

Operation S404: Perform depth optimization to determine optimized binocular depth data. Through operation S404, a depth calculation result obtained in operation S403 may be optimized to obtain the optimized binocular depth data. A big aperture effect, namely, bokeh, can be implemented based on the optimized binocular depth data.

In some embodiments, operation S405 may be further performed after operation S403.

Operation S405: Perform automatic focus (AF) determining based on the binocular depth data. The binocular image data may be obtained by performing image collection by the binocular system, or may be obtained by one collection unit by performing image collection twice on two relatively close locations for a scene.

Figure 5:
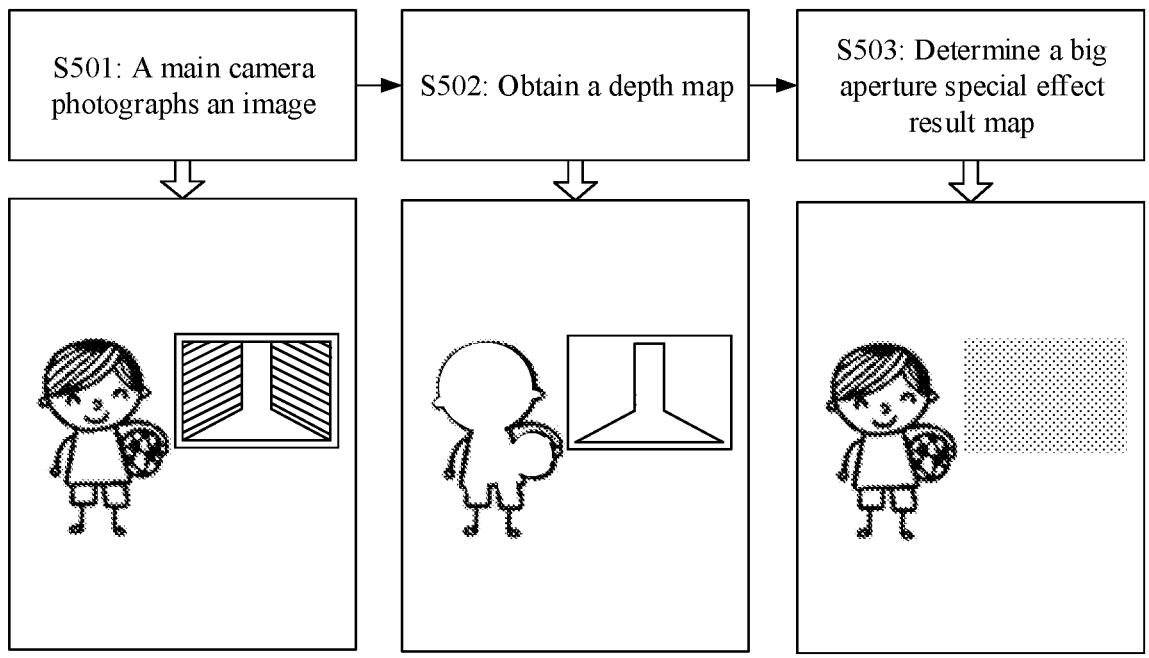
FIG. 5 is a schematic diagram of a procedure and an image of a depth-based image blurring method.

FIG. 5 is a schematic diagram of a procedure and an image of a depth-based image blurring method.

Operation S501: A main camera photographs an image. All objects in the image are basically clear.

Operation S502: Obtain a depth map corresponding to the image of the main camera. In the depth map, a pixel value of each point represents a depth value from the point to the main camera.

Operation S503: Determine a big aperture special effect result map. For example, if the image photographed by the main camera is a portrait, a point in the big aperture special effect result map that has a same depth value as the portrait remains clear, and a point that has a different depth value from the portrait is blurred.

In some cases, an error may occur in binocular system-based depth calculation, resulting in an incorrect blurring effect. Calculating a depth based on the binocular system is mainly performing matching on a main image and a secondary image based on features of three primary colors of red, green, and blue (RGB). The depth calculation has unstable reliability and low accuracy.

Figure 6:
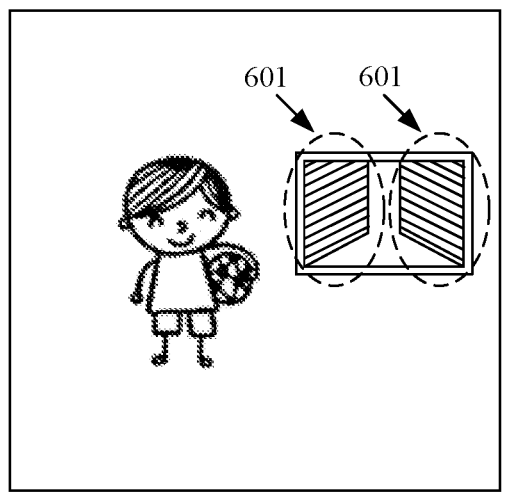
FIG. 6 is a schematic diagram of an example of an image picture collected by a main camera.
Figure 7:
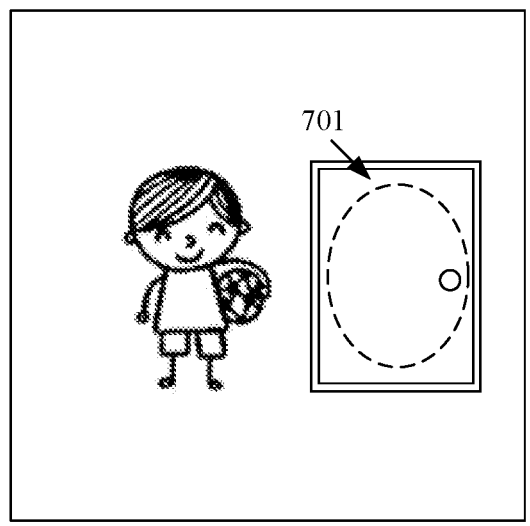
FIG. 7 is a schematic diagram of another example of an image picture collected by a main camera.

FIG. 6 shows an example of an image picture collected by a main camera. In a repeated texture region shown in 601, for example, a shutter or a sticker, because RGB features appear repeatedly, it is impossible to accurately determine a location point whose feature is used for matching a main image with a secondary image, which may cause a depth calculation error. FIG. 7 shows another example of an image picture collected by a main camera. In a weak texture region shown in 701, for example, a corner of a wall or a door and a handle of a same color, because an RGB feature is not obvious or there is no feature at all, in other words, a color difference of the region is relatively small, a main image and a secondary image cannot match, which may also cause a depth calculation error. Due to a depth error, an error may occur in a blurring result map, an expected blurring effect cannot be achieved, and user experience is relatively poor.

Based on a binocular depth estimation principle, a blurring result error may occur in a binocular system-based image blurring result for regions such as a repeated texture region and a weak texture region. To resolve the foregoing problem, this application provides an image processing method based on a binocular system and a TOF system.

The binocular system may determine a dense depth map. The depth map has a relatively large quantity of pixels and high resolution. In addition, the binocular system is consistent with the sense of human eyes, and has a wider application scope. However, precision and stability of the depth map determined by using the binocular system are relatively poor. For example, a blurring error is prone to occur in a repeated texture region or a weak texture region. In addition, because depth precision of the binocular system is relatively low, blurring three-dimensionality of a collected region of interest (ROI) image (for example, a depth gradient plane or curved surface such as a face) is relatively poor. Both a depth jumping region and a depth jumping region in the embodiments of this application may be portrait regions.

A TOF technology is a technology that uses a laser to calculate a depth. By using the TOF technology, depth calculation may be performed based on a time difference between laser transmission and reception, and is independent of an RGB feature. Depth calculation based on the TOF system has high precision and high stability. However, due to a limitation of a sampling quantity, the TOF system can determine only a sparse depth map, and resolution of the depth map is relatively low. In addition, because there is no feedback information for a remote point, the TOF system cannot collect a depth of the remote point, and a point without data occurs in the depth map. Due to possible interference of a laser signal, an incorrect depth jumping point may occur in the depth map.

Figure 8:
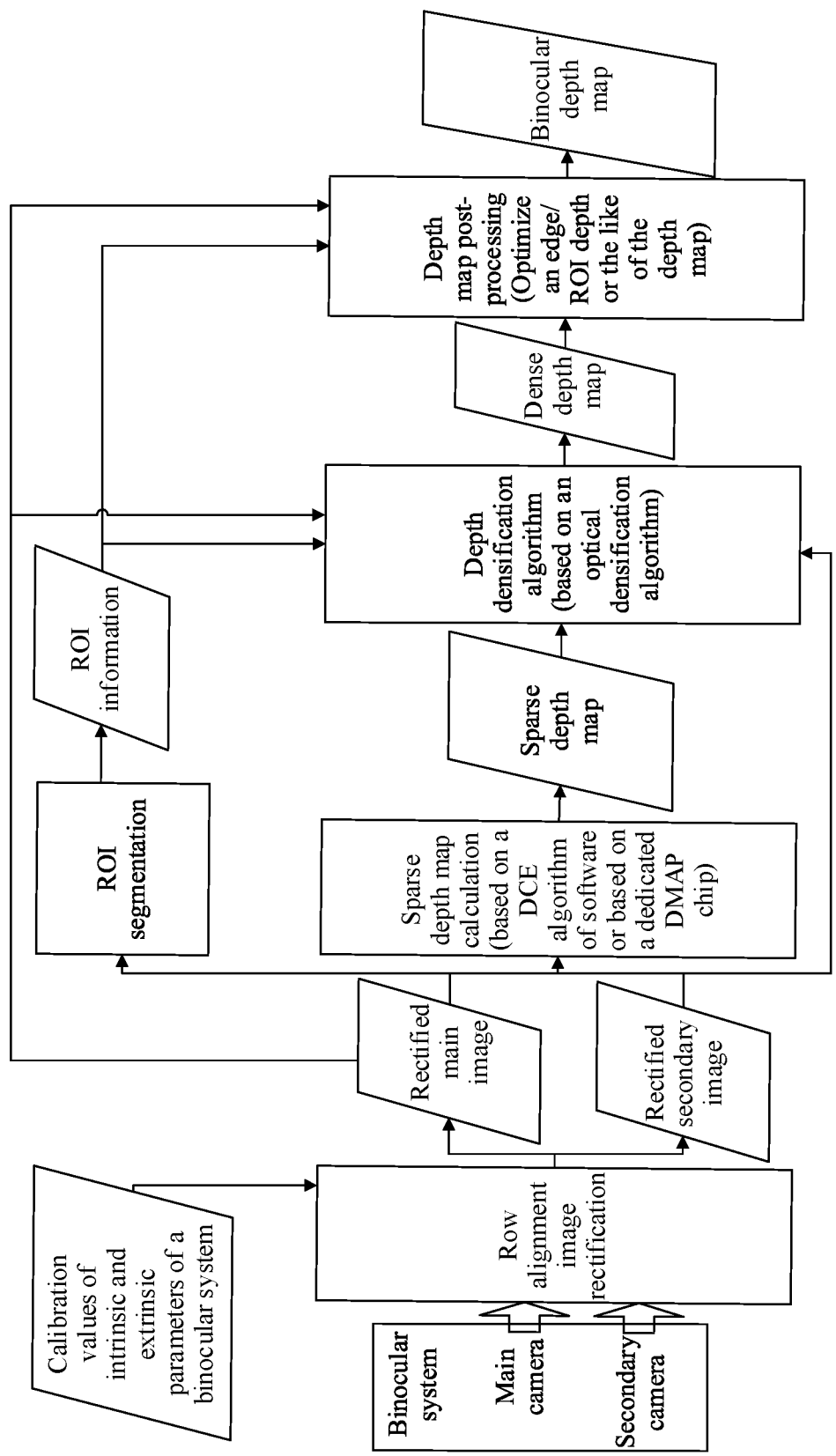
FIG. 8 is a schematic flowchart of a binocular system-based depth calculation method.

FIG. 8 is a schematic flowchart of a binocular system-based depth calculation method.

Binocular depth calculation may mainly include four operations: image rectification, sparse depth map calculation, dense depth map calculation, and post-processing.

Image rectification rectifies an input binocular image by using preset intrinsic and extrinsic parameters of a binocular system, to obtain an image after row alignment rectification. Row alignment image calibration is performed on binocular data collected by the binocular system based on calibration values of intrinsic and extrinsic parameters of the binocular system, to obtain a rectified main image and a rectified secondary image. For example, row alignment image calibration may be performed on the binocular image.

The intrinsic parameters of the binocular system may include a focal length, a coordinate axis tilt parameter, coordinates of a principal point, and the like, and may further include radial and tangential distortion parameters and the like. The extrinsic parameters of the binocular system may include a rotation parameter, a translation parameter, and the like.

An ROI region may be determined by performing ROI segmentation based on the rectified main image and the rectified secondary image. The ROI region may be an image region selected from the image, and a feature of this region may be a focus of image analysis. Some regions in the image may be irrelevant, for example, the sky, a wall, and grassland. The ROI region may include, for example, a depth gradient region such as a face.

A sparse depth map may be further determined based on the rectified main image and the rectified secondary image. The sparse depth map may be obtained through sparse depth map calculation. The sparse depth map calculation may be performed in one or more manners that are existing or may occur in the future. The sparse depth map calculation may be performed based on software executing a depth calculation engineering (DCE) module algorithm, or may be performed based on a depth calculation hardware chip. The depth calculation hardware chip may be, for example, a dedicated DMAP chip. The sparse depth map may be obtained by performing sparse depth map calculation on the rectified main image and the rectified secondary image. The sparse depth map may be a sparse depth map based on a main image, or may be a sparse depth map based on a secondary image. The sparse depth map may also be referred to as a binocular sparse depth map or binocular sparse depth data.

After the ROI region and sparse depth map data are determined, a dense depth map may be determined based on the rectified main image, the rectified secondary image, the ROI region, and the sparse depth map. The dense depth map may be obtained in a plurality of manners. For example, the dense depth map may be determined by using a depth densification algorithm. The depth densification algorithm may be, for example, an optical flow depth densification algorithm. For dense depth calculation, the dense depth map may be obtained based on a depth densification calculation method such as an optical flow depth densification calculation method by using the rectified main image, the rectified secondary image, the sparse depth map, and the like. In an embodiment, in the depth densification algorithm, different parameters may be used for calculation inside and outside the ROI region. For example, a calculation parameter outside the ROI region may enable a depth calculation result outside the ROI region to be smoother, and a calculation parameter inside the ROI region may enable a depth change inside the ROI region to be more prominent. The dense depth map may also be referred to as a binocular dense depth map or binocular dense depth data.

For the depth map post-processing, an edge of the depth map is optimized based on information such as the main image, the ROI region, and the dense depth map, to rectify depth errors inside or outside a portrait and determine a final binocular dense map. The binocular depth map may also be referred to as a binocular dense depth map or binocular dense depth data. The ROI region may be a portrait region in the main image.

The binocular depth map determined according to the method in FIG. 8 has high resolution and is consistent with the sense of human eyes, but has relatively poor precision and stability. In the embodiments of this application, the method in FIG. 8 is improved with reference to TOF depth data.

TOF means using a time difference between laser transmission and reception to obtain a depth result. The TOF depth data may be obtained by using a dedicated depth calculation chip or an image signal processing (image signal processing, ISP) algorithm. For example, a TOF sparse depth map may be obtained from a system.

Performing image processing based on a binocular system and a TOF system can combine advantages of a binocular depth estimation principle and a TOF depth estimation principle, so that an ideal image blurring result can be obtained.

Figure 9:
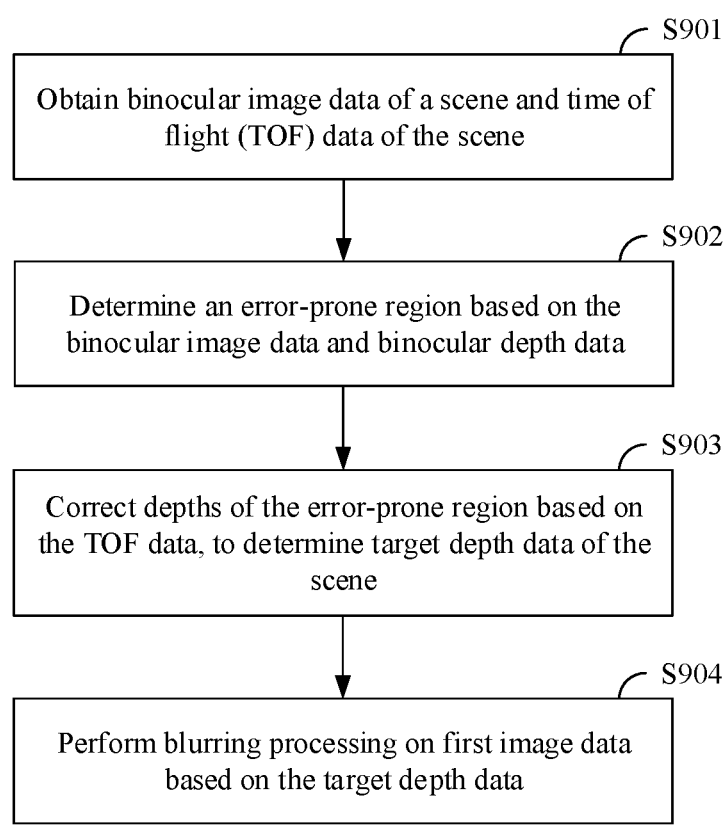
FIG. 9 is a schematic flowchart of an image processing method according to an embodiment of this application.

FIG. 9 is a schematic flowchart of an image processing method according to an embodiment of this application.

Operation S901: Obtain binocular image data of a scene and time of flight (TOF) data of the scene, where the binocular image data includes first image data and second image data.

The binocular image data of the scene may be obtained by using a binocular system, or may be obtained from a storage apparatus or an image collection apparatus.

The TOF data may be collected by using a TOF device, or may be collected from the storage apparatus or a TOF data collection apparatus. The TOF data may be TOF time data, or may be TOF depth data. A signal transmitted by a transmitter is received by a receiver after being reflected by an object in the scene. The TOF time data may include a round trip time of the signal. The TOF time data is processed, and the TOF depth data may include depths of the scene. The TOF time data includes a TOF time collected by the TOF device. The TOF depth data includes TOF depths determined based on the TOF time data. In the TOF data, because depths of the object in the scene are relatively large, it is possible that a signal is not received by the receiver, and a point without data exists. It may be determined, based on the point without data in the TOF data, that a depth of the object in the scene corresponding to the point without data is relatively large, for example, the depth is greater than a preset value. Therefore, the depth corresponding to the point without data may also be determined by using the point without data.

The first image data and the second image data are image data collected by two image collection units (for example, cameras) in the binocular system for the scene, respectively. For example, the first image data is image data collected by a main camera, and the second image data is image data collected by a secondary camera. The first image data may be to-be-displayed image data, for example, image data displayed on a screen, a display, or a display panel.

Before operation S902, depths of the TOF data and/or binocular depth data may be adjusted, so that a system depth error between the TOF data and the binocular data is less than a second preset value.

Before operation S902, relative locations or a relative location of the TOF data and/or the binocular depth data may be adjusted, so that a system location error between the TOF data and the binocular data is less than a third preset value.

Because of a difference in measurement methods and principles, there may be a specific system difference between the binocular depth data determined based on the binocular image data and the TOF data obtained based on a TOF component, for example, a difference in a location or a difference in depths of each object in the scene in a picture. The system error is caused by a system difference in collection and calculation processes of a binocular depth map and a TOF depth map.

A TOF sparse depth map and the binocular depth map may be matched through offline calibration, online calibration, or the like, in other words, coordinate alignment may be performed. The coordinate alignment may be row alignment and/or column alignment. For example, a difference matching parameter of the TOF sparse depth map and the binocular depth map is obtained through offline calibration, so that TOF depth values are matched in the binocular depth map. For example, relative locations or a relative location of the TOF data and/or the binocular depth data may be adjusted, so that a system coordinate error between the TOF data and the binocular depth data is less than a second preset value.

The TOF data and/or the binocular depth data may be adjusted, so that a depth error between the TOF data and the binocular depth data that is caused by a system is reduced or even eliminated. For example, depths of the TOF data and/or the binocular depth data may be adjusted, so that a system depth error between the TOF data and the binocular depth data is less than a third preset value. The system depth error is caused by a difference between calculation principles of the TOF data and the binocular depth data.

The locations and the depths of the TOF data and the binocular depth data are adjusted, so that the TOF sparse depth map is matched with the binocular depth map.

A sequence of adjusting the locations and the depths is not limited in this embodiment of this application. The relative locations or the relative location of the TOF data and/or the binocular depth data may be adjusted before, after, or at the same time when the depths of the TOF data and/or the binocular depth data are adjusted.

In an embodiment, the method includes: correcting the binocular depth data based on the TOF data, to obtain corrected binocular depth data, where the binocular depth data is determined based on the binocular image data. Specifically, in operation S902, an error region is determined based on the binocular image data and the binocular depth data.

The error region may be, for example, a region whose precision and/or stability do or does not meet a requirement. In other words, the error region is a region whose precision and/or stability in depth data determined through a binocular depth estimation do or does not meet a requirement. The error region may also be referred to as an error-prone region. The error region may be an error-prone region in a depth map calculated by using binocular data.

The error region may be determined based on the first image data and the binocular depth data, or the error region may be determined based on the second image data and the binocular depth data.

Based on a binocular depth estimation principle, a blurring result error may occur in a binocular system-based image blurring result for regions such as a repeated texture region and a weak texture region. In other words, stability of binocular depth data may not meet a requirement for the regions such as a repeated texture region and a weak texture region. When the binocular depth data is determined by using the binocular image data, the first image data and the second image data need to be matched. Because it is difficult to perform matching on images of the regions such as a repeated texture region and a weak texture region, an image matching error may cause a depth error of the regions. The weak texture region may also be referred to as a region whose color difference is not obvious, in other words, a color difference of the region is less than a preset value.

To implement a big aperture blurring effect, different regions of same image data may have different precision requirements for depth data. For example, depths of a background region in an image may have a relatively low precision requirement, and an ROI region such as a portrait may have a relatively high precision requirement. Therefore, for a depth gradient region, precision of binocular depth data determined by using binocular data may not meet a requirement. The depth gradient region may be, for example, a region whose depth change amount is less than or equal to a preset value.

The binocular depth data is determined based on the binocular image data. The binocular depth data may be binocular dense depth data, or may be binocular sparse depth data. The binocular depth data may be a depth map determined based on the binocular image data.

In the binocular dense depth data, there is little effective information and low pixel precision. The binocular dense depth data may be performed based on software executing a DCE module algorithm, or may be performed based on a depth calculation hardware chip. The depth calculation hardware chip may be, for example, a dedicated DMAP chip.

In the binocular dense depth data, there is much effective information and high pixel precision. The binocular dense depth data may be performed based on software executing a depth densification algorithm, and the depth densification algorithm may be, for example, an optical flow densification algorithm.

A feature in the binocular image data may be extracted based on the binocular image data and the binocular depth data. The extracted feature may include, for example, a person, a finger, a car, a car window, a white wall, repeated window curtain grids, or the sky. The error region may be a region corresponding to one or more of all extracted features.

Operation S903: Correct depths of the error region based on the TOF data, to determine the corrected binocular depth data of the scene.

The correcting depths of the error region may include: for the error region, determining corrected binocular depth data of the error region based on TOF depth data of the error region.

Through the operations S902 and S903, the depths of the error region in the binocular depth data may be corrected. Only the depths of the error region are corrected, so that a calculation amount can be reduced, and accuracy of corrected depths can be improved. The correcting depths of the error region in the binocular depth data may include: using the TOF depth data of the error region as depth data of the error region, and determining the corrected binocular depth data of the error region by using a densification algorithm.

For example, the operations S902 and S903 may include the following operations:
  determining a first error region based on the binocular dense depth data and the first image data; and
  correcting depths of the first error region based on the TOF data and the binocular dense depth data. The error region includes the first error region.

The binocular depth data includes the binocular dense depth data. A result of correcting the depths of the first error region may be used as the corrected binocular depth data for blurring processing. Referring to FIG. 8, the binocular dense depth data may be a dense depth map in FIG. 8, or may be a binocular depth map in FIG. 8.

In other words, for the first error region, corrected binocular depth data of the first error region may be determined based on the TOF depth data of the error region. For example, the corrected binocular depth data of the first error region may be determined by using a densification algorithm. For a region other than the first error region, binocular dense depth data of the region other than the first error region may be used as corrected binocular depth data of the region other than the first error region. The corrected binocular depth data may be dense depth data. In other words, depths that are of the first error region and that correspond to the TOF data may be used as the depths of the first error region; densification processing is performed on the depths of the first error region; and depths that are of the region other than the first error region and that correspond to the binocular dense depth data are used as corresponding depths of the region other than the first error region, to obtain the corrected binocular depth data.

A result of correcting the depths of the first error region may be alternatively used as first corrected dense depth data for further correction.

In other words, for the first error region, first corrected dense depth data of the first error region may be determined based on the TOF depth data of the error region. For example, the first corrected dense depth data of the first error region may be determined by using a densification algorithm. For a region other than the first error region, binocular dense depth data of the region other than the first error region may be used as first corrected dense depth data of the region other than the first error region. The first corrected dense depth data may be dense depth data. In other words, depths that are of the first error region and that correspond to the TOF data may be used as the depths of the first error region; densification processing is performed on the depths of the first error region; and depths that are of the region other than the first error region and that correspond to the binocular dense depth data are used as corresponding depths of the region other than the first error region, to obtain the first corrected dense depth data.

For another example, the operations S902 and S903 may include the following operations:
  determining a first error region based on the binocular sparse depth data, the first image data, and the second image data; and
  correcting depths of the first error region based on the TOF data and the binocular sparse depth data.

The error region includes the first error region. The binocular depth data includes the binocular sparse depth data.

A result of correcting the depths of the first error region may be used as the corrected binocular depth data for blurring processing.

In other words, for the first error region, corrected binocular depth data of the first error region may be determined based on the TOF depth data of the error region. For example, the corrected binocular depth data of the first error region may be determined by using a densification algorithm. For a region other than the first error region, corrected binocular depth data of the region other than the first error region may be determined based on binocular sparse depth data of the region other than the first error region. The corrected binocular depth data may be dense depth data. In other words, depths that are of the first error region and that correspond to the TOF data may be used as the depths of the first error region; depths that are of the region other than the first error region and that correspond to the binocular sparse depth data are used as corresponding depths of the region other than the first error region; and densification processing is performed on the depths of the first error region and the region other than the first error region, to obtain the corrected binocular depth data.

A result of correcting the depths of the first error region may be alternatively used as first corrected dense depth data for further correction.

In other words, for the first error region, first corrected dense depth data of the first error region may be determined based on the TOF depth data of the error region. For example, the first corrected dense depth data of the first error region may be determined by using a densification algorithm. For a region other than the first error region, first corrected dense depth data of the region other than the first error region may be determined based on binocular sparse depth data of the region other than the first error region. For example, the first corrected dense depth data of the region other than the first error region may be determined by using a densification algorithm. The first corrected dense depth data may be dense depth data. In other words, depths that are of the first error region and that correspond to the TOF data may be used as the depths of the first error region; depths that are of the region other than the first error region and that correspond to the binocular sparse depth data are used as corresponding depths of the region other than the first error region; and densification processing is performed on the depths of the first error region and the region other than the first error region, to obtain the first corrected dense depth data.

In the foregoing two examples, the further correction may include the following operations: determining a second error region based on the first corrected dense depth data, the TOF data, and the first image data; and
  correcting depths of the second error region based on the TOF data and the first corrected dense depth data, to determine the corrected binocular depth data.

The error region includes the second error region.

The first error region may include at least one of the following regions: a repeated texture region, a region whose color difference is less than a preset value, or a depth gradient region.

The first error region may be determined based on a main image and the binocular depth map. A first error-prone region is determined based on texture information in the main image, and the first error region is determined from the first error-prone region based on the binocular depth map, where in the binocular depth map, differences between depth values of the first error region and depth values around the first error region are greater than or equal to a first preset value.

The second error region includes a depth jumping region in the first corrected dense depth data.

The second error region is determined based on the main image and the binocular depth map. An edge region of an object in the main image is determined based on red, green, and blue RGB information in the main image, and the second error region is determined from the edge region based on the binocular depth map, where the edge region includes the second error region, and in the binocular depth map, differences between depth values of the second error region and depth values around the second error region are greater than or equal to a second preset value.

For the second error region, corrected binocular depth data of the second error region may be determined based on the TOF depth data of the error region. For example, the corrected binocular depth data of the second error region may be determined based on the TOF depth data of the error region by using a densification algorithm. For a region other than the second error region, first corrected dense depth data of the region other than the second error region may be used as corrected binocular depth data of the region other than the first error region. In other words, depths that are of the second error region and that correspond to the TOF data may be used as the depths of the second error region; densification processing is performed on the depths of the second error region; and depths that are of the region other than the second error region and that correspond to the first corrected dense depth data are used as corresponding depths of the region other than the second error region, to obtain the corrected binocular depth data.

The error region may include a portrait region.

A portrait region in the main image may be determined based on the RGB information in the main image. Depth values that are in the binocular depth map and that correspond to the error region may be corrected through a neural network by using depth values that are in the TOF depth map and that correspond to the portrait region.

In further correction, it may be determined, through threshold determining, whether the TOF data is effective, to remove a possible exception point in the TOF data. The exception point may include a depth error jumping point and/or a point without data. TOF determining data may be effective TOF depth data, or may be an identifier, for example, "0" or "1", indicating whether TOF depth data is effective. A form of the TOF determining data is not limited in this embodiment of this application. An example in which the TOF data is TOF depth data is used for description. For example, data, in the TOF depth data, whose depth meets a threshold condition may be marked effective. The threshold condition may be that a depth meets a specific value range, for example, is greater than or less than a preset value.

The determining the second error region based on the first corrected dense depth data, the TOF data, and the first image data may include: determining the second error region based on the first corrected dense depth data, the TOF data, the TOF determining data, and the first image data. In this case, the second error region does not include a region corresponding to ineffective TOF depth data. In other words, in further correction, only depths of a region corresponding to effective TOF depth data may be corrected, and depths of a region corresponding to ineffective TOF depth data are not corrected.

Operation S904: Perform blurring processing on the first image data based on the corrected binocular depth data.

Figure 10:
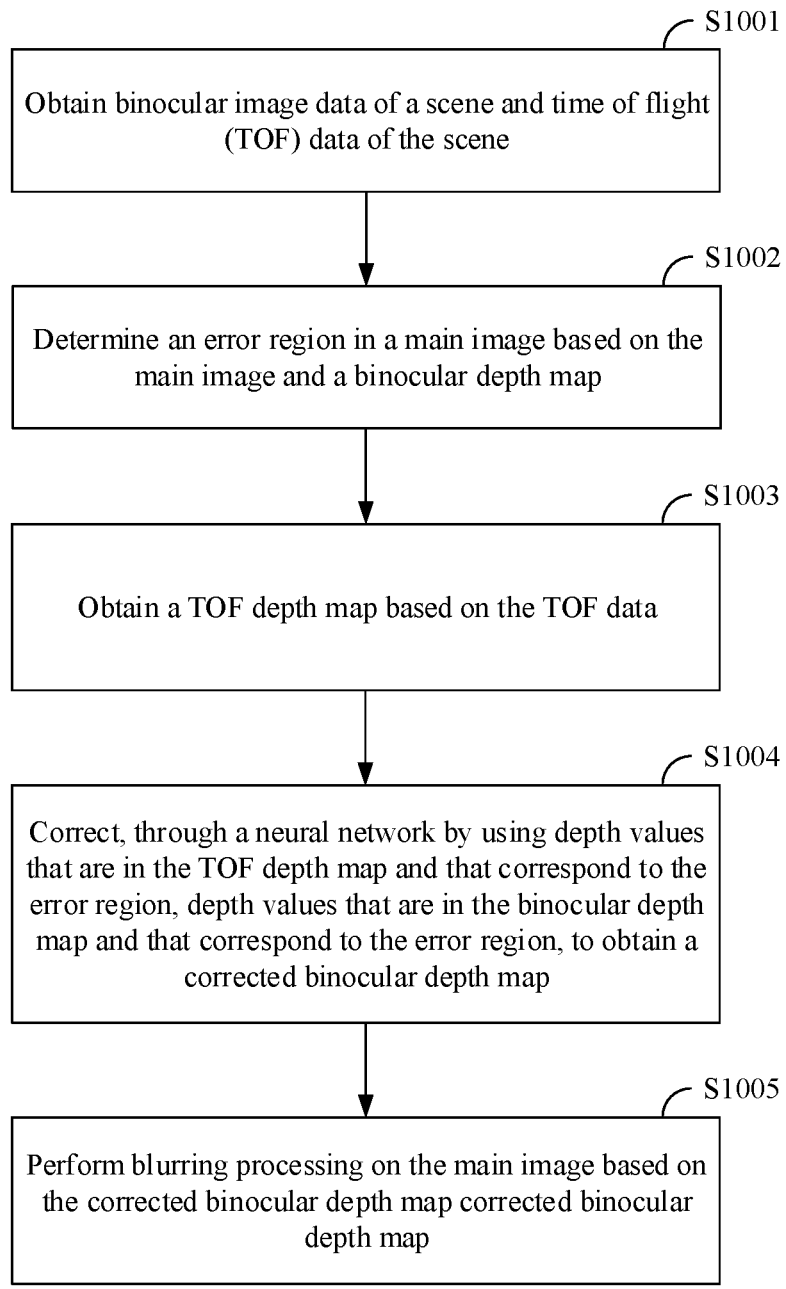
FIG. 10 is a schematic flowchart of an image processing method according to another embodiment of this application.

FIG. 10 is a schematic flowchart of an image processing method according to an embodiment of this application.

Operation S1001: Obtain binocular image data of a scene and time of flight (TOF) data of the scene, where the binocular image data includes a main image obtained by using a main camera.

Operation S1002: Determine an error region in the main image based on the main image and a binocular depth map, where the binocular depth map is determined based on the binocular image data.

Operation S1003: Obtain a TOF depth map based on the TOF data.

Operation S1004: Correct, through a neural network by using depth values that are in the TOF depth map and that correspond to the error region, depth values that are in the binocular depth map and that correspond to the error region, to obtain a corrected binocular depth map, where the corrected binocular depth map includes depth values corresponding to the error region and depth values corresponding to another region, the another region is a region other than the error region in the main image, and the depth values corresponding to the another region are obtained based on depth values that are in the binocular depth map and that correspond to the another region.

In an embodiment, depth values corresponding to a first error region may be corrected through a neural network by using depth values that are in the TOF depth map and that correspond to the first error region, to obtain a first corrected binocular depth map; and depth values that are in the first corrected binocular depth map and that correspond to a second error region may be corrected through a neural network by using depth values that are in the TOF depth map and that correspond to the second error region, to obtain the corrected binocular depth map.

In an embodiment, the binocular depth map is a binocular dense depth map; and that the depth values corresponding to the another region are obtained based on depth values that are in the binocular depth map and that correspond to the another region includes: the depth values of the another region are depth values that are in the binocular dense depth map and that correspond to the another region.

In an embodiment, the binocular depth map is a binocular sparse depth map; and that the depth values corresponding to the another region are obtained based on depth values that are in the binocular depth map and that correspond to the another region includes: the depth values of the another region are obtained by performing densification processing on depth values that are in the binocular sparse depth map and that correspond to the another region. The densification processing may be, for example, a densification processing method such as optical flow densification processing.

In an embodiment, the method further includes: determining a portrait region based on the main image, where a second error region is located outside a first error region and the portrait region; correcting, through a neural network by using depth values in the TOF depth map that correspond to the first error region and the portrait region, depth values in the binocular depth map that correspond to the first error region and the portrait region, to obtain first corrected binocular depth map; and correcting, by using depth values that are in the TOF depth map and that correspond to the second error region, depth values that are in the first corrected binocular depth map and that correspond to the second error region, to obtain the corrected binocular depth map.

Operation S1005: Perform blurring processing on the main image based on the corrected binocular depth map corrected binocular depth map.

The error region may include the first error region and/or the second error region.

The first error region may include a repeated texture region and/or a region whose color difference is less than a preset value.

The first error region may be determined based on the main image and the binocular depth map. A first error-prone region is determined based on texture information in the main image, and the first error region is determined from the first error-prone region based on the binocular depth map, where in the binocular depth map, differences between depth values of the first error region and depth values around the first error region are greater than or equal to a first preset value.

The second error region may be a depth jumping region.

The second error region may be determined based on the main image and the binocular depth map. An edge region of an object in the main image is determined based on red, green, and blue RGB information in the main image, and the second error region is determined from the edge region based on the binocular depth map, where the edge region includes the second error region, and in the binocular depth map, differences between depth values of the second error region and depth values around the second error region are greater than or equal to a second preset value.

The second error region may be all depth jumping regions in the main image, or may be a depth jumping region around the portrait region in the main image.

The second error region may be determined based on the main image, the binocular depth map, and the portrait region. An edge region of an object in the main image is determined based on red, green, and blue RGB information in the main image, and the second error region around the portrait region is determined from the edge region based on the binocular depth map, where the edge region includes the second error region, and in the binocular depth map, differences between depth values of the second error region and depth values around the second error region are greater than or equal to a second preset value.

The portrait region may be determined based on the RGB information in the main image. The portrait region may be, for example, all regions of the human body in the main image, or may be some regions of the human body, for example, a face region or a hand region. The portrait region may also be understood as an error region.

The first error region, the second error region, and the portrait region may be corrected in a same processor or different processors. The first error region, the second error region, and the portrait region may be or may not be corrected at the same time.

For example, the first error region and the portrait region may be corrected in a first-level network, the second error region may be corrected in a second-level network, and the first-level network and the second-level network may be neural networks.

A relationship between the first error region and the portrait region is not limited in this embodiment of this application. For example, the first error region does not include the portrait region, or includes all or a part of the portrait region.

In an embodiment, the second error region includes a depth jumping region in the binocular depth map.

In an embodiment, the first error region includes at least one of the following regions: a repeated texture region, a region whose color difference is less than a first preset value, or a depth gradient region.

In an embodiment, before the correcting depths of the error region based on the TOF data, to determine a corrected binocular depth map, the method further includes: adjusting depths of the TOF depth map and/or the binocular depth map, so that a system depth error between the TOF depth map and the binocular depth map is less than a second preset value.

In an embodiment, before the correcting depths of the error region based on the TOF data, to determine a corrected binocular depth map, the method further includes: adjusting relative locations or a relative location of the TOF depth map and/or the binocular depth map, so that a system location error between the TOF depth map and the binocular depth map is less than a third preset value.

Figure 11:
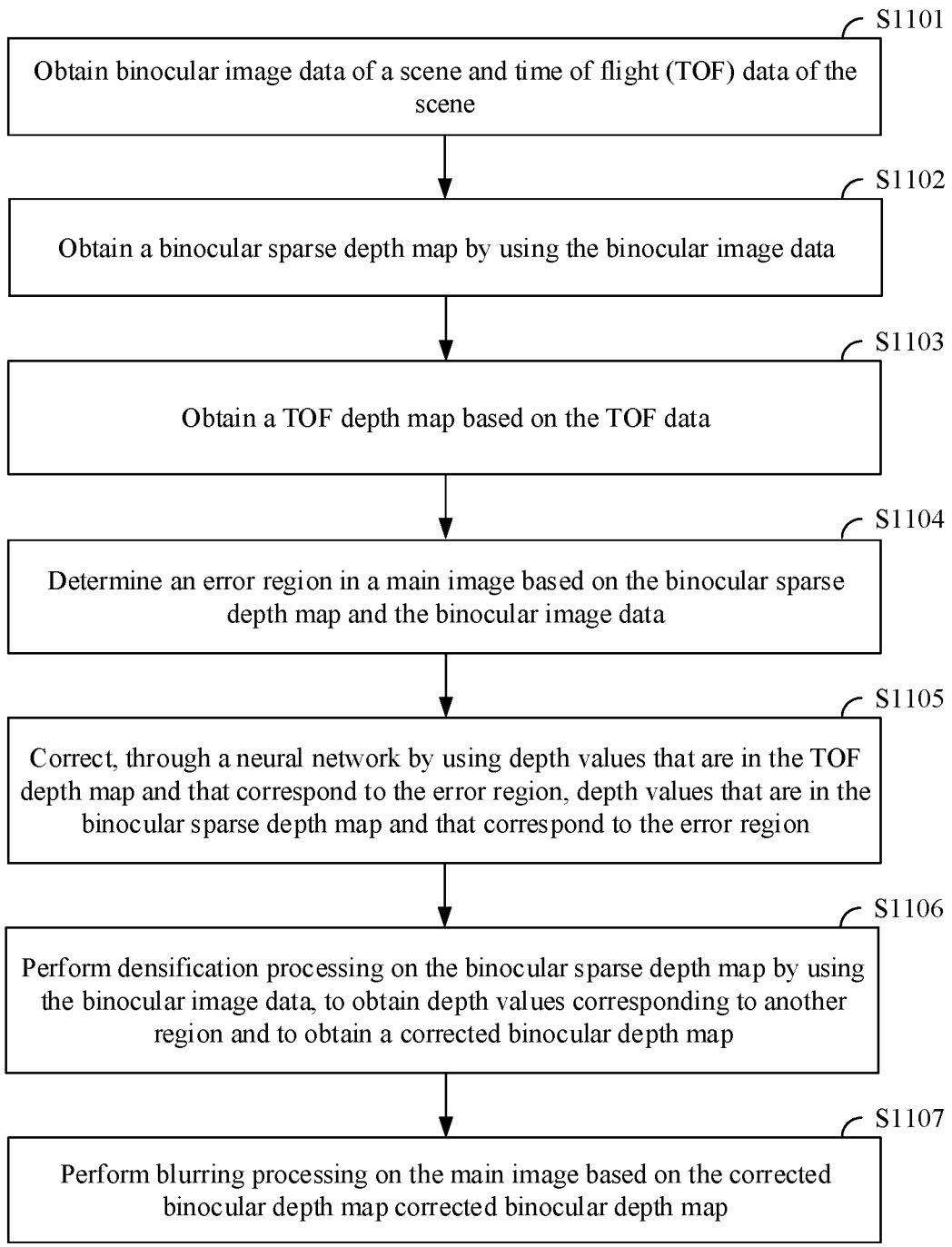
FIG. 11 is a schematic flowchart of an image processing method according to another embodiment of this application.

FIG. 11 is a schematic flowchart of an image processing method according to an embodiment of this application.

Operation S1101: Obtain binocular image data of a scene and time of flight (TOF) data of the scene, where the binocular image data includes a main image obtained by using a main camera.

Operation S1102: Obtain a binocular sparse depth map by using the binocular image data.

Operation S1103: Obtain a TOF depth map based on the TOF data.

Operation S1104: Determine an error region in the main image based on the binocular sparse depth map and the binocular image data.

Operation S1105: Correct, through a neural network by using depth values that are in the TOF depth map and that correspond to the error region, depth values that are in the binocular sparse depth map and that correspond to the error region.

Operation S1106: Perform densification processing on the binocular sparse depth map by using the binocular image data, to obtain depth values corresponding to another region and to obtain a corrected binocular depth map, where the corrected binocular depth map includes depth values corresponding to the error region and depth values corresponding to another region, and the another region is a region other than the error region in the main image.

For example, a portrait region may be determined based on the main image, where a second error region is located outside a first error region and the portrait region; and depth values in the binocular depth map that correspond to the first error region and the portrait region may be corrected through a neural network by using depth values in the TOF depth map that correspond to the first error region and the portrait region, to obtain a first corrected binocular depth map, where the first corrected binocular depth map includes depth values corresponding to the first error region and the portrait region and depth values corresponding to a first other region, and the first other region is a region other than the first error region and the portrait region in the main image.

Densification processing may be performed on the binocular sparse depth map by using the binocular image data, to obtain depth values corresponding to another region.

Densification processing may be performed on the binocular sparse depth map by using the binocular image data, to obtain the depth values that are in the first corrected binocular depth map and that correspond to the first other region.

Depth values that are in the first corrected binocular depth map and that correspond to the second error region may be corrected through a neural network by using depth values that are in the TOF depth map and that correspond to the second error region, to obtain the corrected binocular depth map. The corrected binocular depth map includes depth values corresponding to the second error region and depth values corresponding to another region, and the depth values of the another region are depth values that are in the first corrected binocular depth map and that correspond to the another region.

For example, depth values that are in the binocular depth map and that correspond to a first error region may be corrected through a neural network by using depth values that are in the TOF depth map and that correspond to the first error region, to obtain a first corrected binocular depth map, where the first corrected binocular depth map includes depth values corresponding to the first error region and depth values corresponding to a first other region, and the first other region is a region other than the first error region in the main image.

Densification processing may be performed on the binocular sparse depth map by using the binocular image data, to obtain depth values corresponding to another region.

Densification processing may be performed, by using the binocular image data, on depth values that are in the binocular sparse depth map and that correspond to the first other region, to obtain depth values that are in the first corrected binocular depth map and that correspond to the first other region.

Depth values that are in the first corrected binocular depth map and that correspond to a second error region may be corrected through a neural network by using depth values that are in the TOF depth map and that correspond to the second error region, to obtain the corrected binocular depth map. The corrected binocular depth map includes depth values corresponding to the second error region and depth values corresponding to another region, and the depth values of the another region are depth values that are in the first corrected binocular depth map and that correspond to the another region.

Operation S1107: Perform blurring processing on the main image based on the corrected binocular depth map corrected binocular depth map.

In an embodiment, before the correcting depths of the error region based on the TOF data, to determine a corrected binocular depth map, the method further includes: adjusting depths of the TOF depth map and/or the binocular depth map, so that a system depth error between the TOF depth map and the binocular depth map is less than a second preset value.

In an embodiment, before the correcting depths of the error region based on the TOF data, to determine a corrected binocular depth map, the method further includes: adjusting relative locations or a relative location of the TOF depth map and/or the binocular depth map, so that a system location error between the TOF depth map and the binocular depth map is less than a third preset value.

Figure 12:
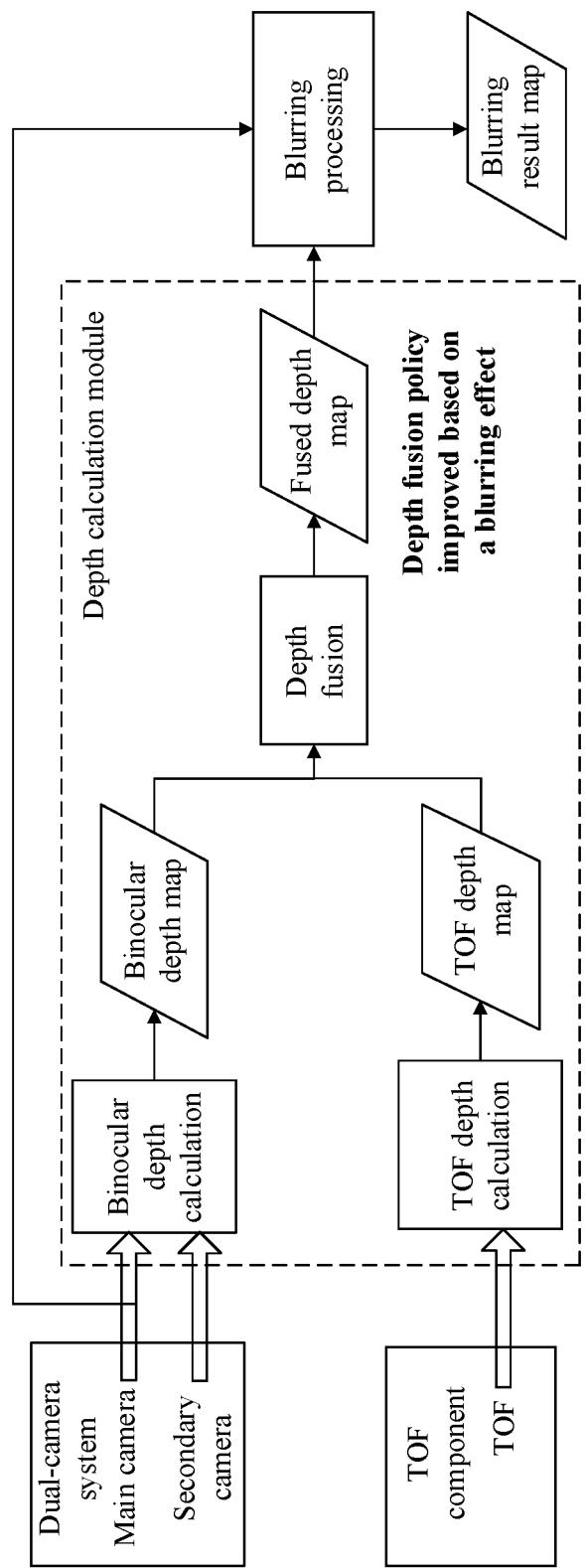
FIG. 12 is a schematic flowchart of an image processing method according to another embodiment of this application.

FIG. 12 is a schematic flowchart of an image processing method according to an embodiment of this application.

First, depth maps of a binocular system and a TOF system are respectively calculated. A binocular depth map is calculated based on binocular image data of the binocular system. TOF depth data is calculated based on TOF data collected by a TOF component.

Then, depth map image fusion is performed based on the binocular depth map and a TOF depth map, to determine a fused depth map. Image fusion (image fusion) means combining two or more images into a new image by using a specific algorithm.

Finally, blurring processing is performed, based on the fused depth map, on a main image collected by a main image collection unit in the binocular system, to obtain a blurring result map.

Depth fusion may be performed by using two levels of convolutional neural networks networks (convolutional neural network, CNN).

Figure 13:
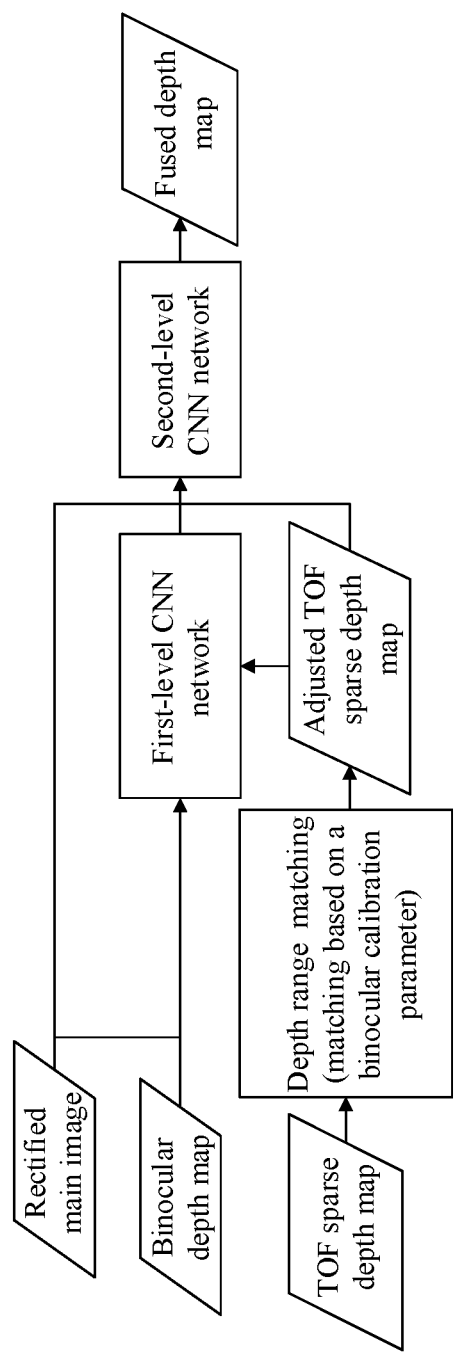
FIG. 13 is a schematic flowchart of a depth fusion method according to an embodiment of this application.

FIG. 13 is a schematic flowchart of a depth fusion method according to an embodiment of this application.

Depth fusion may be performed based on a main image or a rectified main image, a binocular depth map, and a TOF sparse depth map, to obtain a final depth map. The binocular depth map may be a binocular depth map obtained by performing depth post-processing in FIG. 8, or may be a dense depth map obtained without depth post-processing in FIG. 8. Depth fusion may be performed by using two levels of convolutional neural networks (CNN).

Because of a difference in measurement methods and principles, there may be a specific system difference between the binocular depth map and the TOF sparse depth map obtained based on a TOF component, for example, a difference in locations and/or a difference in depths. The system error is caused by a system difference in collection and calculation processes of the binocular depth map and the TOF depth map. The difference in locations may be represented by coordinates in a same coordinate system.

Because of a difference in measurement methods and principles, there may be a specific system difference between binocular depth data determined based on binocular image data and TOF data obtained based on a TOF component, for example, a difference in a location or a difference in depths of each object in a scene in a picture. The system error is caused by a system difference in collection and calculation processes of the binocular depth map and the TOF depth map.

The TOF sparse depth map and the binocular depth map may be matched through offline calibration, online calibration, or the like, in other words, coordinate alignment may be performed. The coordinate alignment may be row alignment and/or column alignment. For example, a difference matching parameter of the TOF sparse depth map and the binocular depth map is obtained through offline calibration, so that TOF depth values are matched in the binocular depth map. For example, locations or a location of the TOF sparse depth map and/or the binocular depth map may be adjusted, so that a system location error between the TOF sparse depth map and the binocular depth map is less than or equal to a preset value. Based on calibration parameters of a binocular system, the TOF sparse depth map and the binocular depth map can be adjusted to a same size. The system location error is caused by a location difference between the TOF component collecting TOF data and the binocular system collecting binocular image data.

Depths of the TOF data may be adjusted, so that a depth error between the TOF data and the binocular depth data that is caused by a system is reduced or even eliminated. The depths of the TOF data are adjusted, so that a system depth error between the TOF data and the binocular depth data is less than or equal to a preset value. The system depth error is caused by a difference between calculation principles of the TOF data and the binocular depth data.

The TOF sparse depth map and/or the binocular depth data may be adjusted, so that a depth error between the TOF data and the binocular depth data that is caused by a system is reduced or even eliminated. For example, depths of the TOF sparse depth map and/or the binocular depth map may be adjusted, so that a system depth error between the TOF sparse depth map and the binocular depth map is less than a third preset value. The system depth error is caused by a difference between calculation principles of the TOF sparse depth map and the binocular depth map.

The locations and the depths of the TOF sparse depth map and the binocular depth map are adjusted, so that the TOF sparse depth map is matched with the binocular depth map.

A first-level CNN network may determine a first error region based on the rectified main image and the binocular depth map. The first-level CNN network may correct the first error region in the binocular depth map based on the TOF sparse depth map, that is, adjust depths of the first error region in the binocular depth map based on TOF depths, to obtain a first corrected dense depth map. The first corrected dense depth map may be used as a final fused depth map.

The first error region may be an error-prone region in a depth map calculated by using binocular data, for example, may be a repeated texture region, a region whose color difference is less than a preset value, or a depth gradient region.

A second-level CNN network may further correct the first corrected dense depth map. The second-level CNN network may determine a second error region based on the rectified main image and the first corrected dense depth map. The second-level CNN network may correct the second error region in the first corrected dense depth map based on the TOF sparse depth map, that is, adjust depths of the second error region in the first corrected dense depth map based on TOF depths, to obtain a fused depth map.

The second error region may be a depth jumping region in the corrected dense depth map. Correcting the depths of the second error region may be used to improve precision of depths of an object edge region in main image data, or may be used to remove an incorrect depth jump.

Blurring processing is performed, based on the fused depth map, on the main image collected by a main image collection unit in the binocular system, to obtain a blurring result map.

Figure 14:
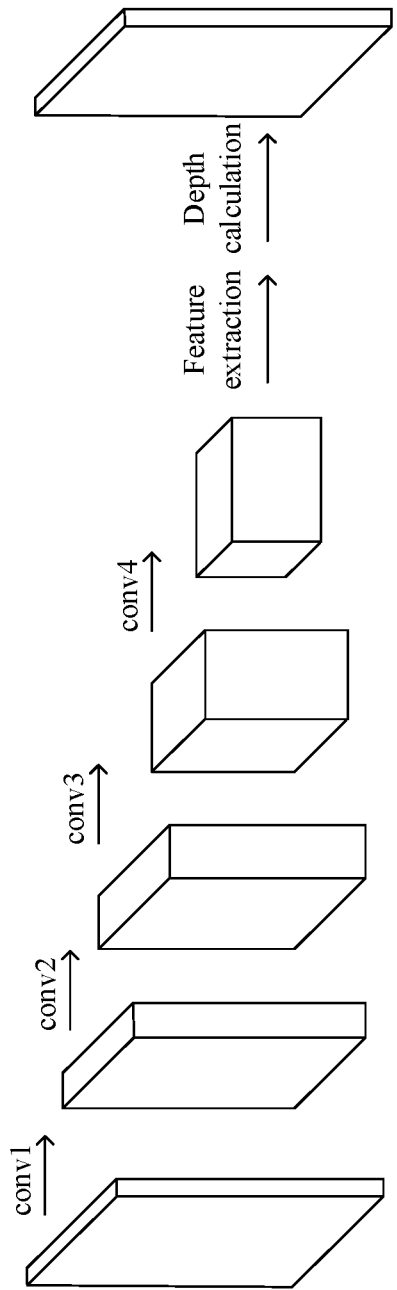
FIG. 14 is a schematic diagram of an operation of an optical flow neural network (flownet)

FIG. 14 is a schematic diagram of an operation of an optical flow neural network (flownet). A vector convolution operation (convolution, cony) may be performed, a plurality of times by using a network structure including only a convolution layer, on binocular data obtained by a binocular system, to extract an image feature for densification depth calculation. Alternatively, features of two pictures may be first independently extracted from binocular data by using another network structure such as one network structure, and then these features are matched, so that densification depth calculation can be performed.

Figure 15:
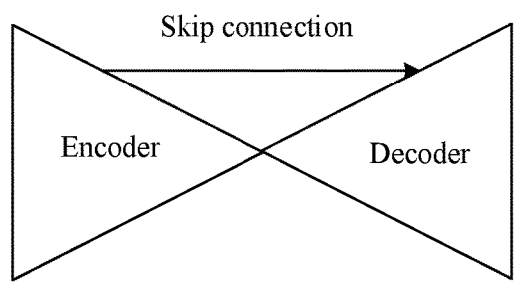
FIG. 15 is a schematic structural diagram of an encoder-decoder network.

Two levels of CNN networks for a depth fusion process may be an encoder-decoder (encoder-decoder) network. FIG. 15 is a schematic structural diagram of an encoder-decoder network. An encoder may analyze input data. The encoder may be used for image recognition. The encoder may be configured to extract a feature of an image. As output of the encoder, the extracted feature may be transmitted to a decoder through skip connection (skip connection). The extracted feature may be, for example, a person, a finger, a car, a car window, a white wall, repeated window curtain grids, or the sky. The decoder may determine an error region in binocular depth data based on the feature extracted by the encoder, and correct depths of the region. The error region may be a region corresponding to one or more of all features extracted by the encoder. The error region may include a repeated texture region, a region whose color difference is less than a preset value, a depth gradient region, a depth jumping region, or the like. The error region may be an error-prone region of binocular depth calculation.

Figure 16:
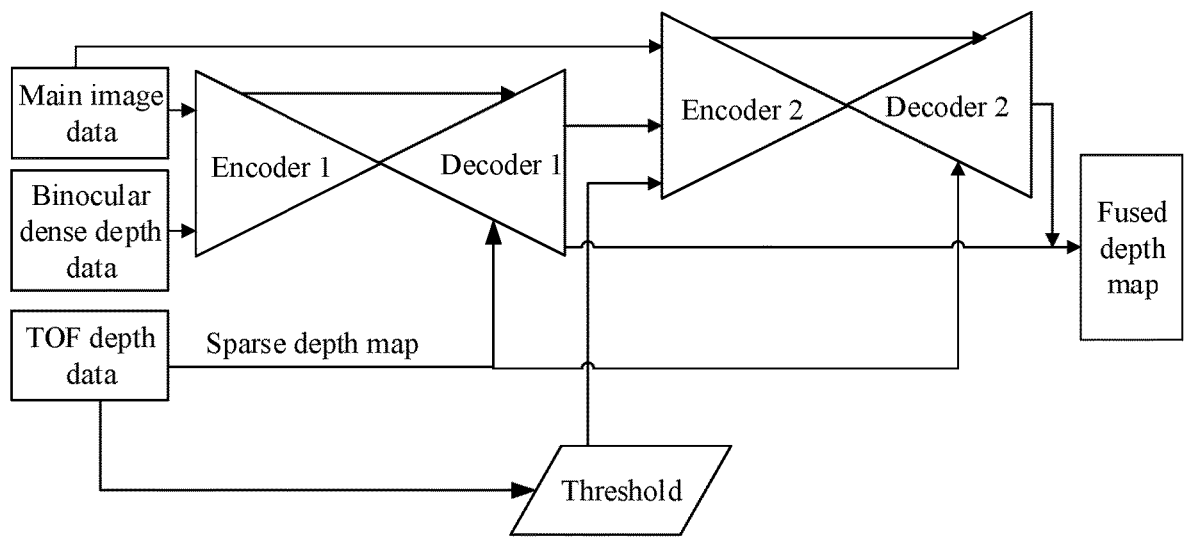
FIG. 16 is a schematic flowchart of an image processing method according to still another embodiment of this application.

FIG. 16 is a schematic flowchart of an image processing method according to an embodiment of this application.

A first-level network device for a depth fusion process may determine a corrected dense depth map based on main image data in binocular data, dense depth data determined by using the binocular data, and TOF depth data. The first-level network device may be an encoder-decoder network, or may be a network of another structure. The first-level network device may be a CNN network device, or may be another artificial intelligence (AI) network. The binocular dense depth data may be dense depth map data used as an intermediate result in FIG. 8, or may be binocular depth map data used as a final result in FIG. 8. The first-level network device may correct depths of a first error region in the binocular dense depth data based on the TOF depth data, to determine the corrected dense depth map. For example, the first-level network device may determine the first error region based on the main image data and the binocular dense depth data. The first error region may be an error-prone region in a depth map calculated by using binocular data, for example, may be a repeated texture region, a region whose color difference is less than a preset value, or a depth gradient region. An encoder 1 in the first-level network device may perform feature extraction based on the main image data and the binocular dense depth data. A decoder 1 in the first-level network device may determine the first error region based on an extracted feature and with reference to the main image data and/or the binocular dense data. Depth correction of the first error region may be performed by the decoder 1 in the first-level network device. The decoder 1 in the first-level network device may correct depths of the first error region in the dense depth data based on the TOF depth data, to determine the corrected dense depth map. The corrected dense depth map output by the first-level network may be used as input to a second-level network. In some embodiments, the corrected dense depth map may be used as a final fused depth map.

The second-level CNN network for a depth fusion process may determine a second dense depth map based on the corrected dense depth map, the main image data, and the TOF depth data. The second-level network device may correct depths of a second error region in the corrected dense depth map to determine a final fused depth map. The second-level network device may be an encoder-decoder network, or may be a network of another structure. The second-level network device may be a CNN network device, or may be another artificial intelligence (AI) network. The final fused depth map may be a dense depth map.

The second-level network device may determine the second error region, for example, may determine the second error region based on the main image data, the corrected dense depth map, and TOF determining data. The second error region may be an object edge region in the main image data, for example, may be a depth jumping region in the corrected dense depth map. Correcting the depths of the second error region may be used to improve precision of depths of the object edge region in the main image data, or may be used to remove an incorrect depth jump.

It may be determined, through threshold determining, whether TOF data is effective, to remove a possible exception point in the TOF data. The exception point may include a depth error jumping point and/or a point without data. The TOF determining data may be effective TOF depth data, or may be an identifier, for example, "0" or "1", indicating whether TOF depth data is effective. A form of the TOF determining data is not limited in this embodiment of this application. The TOF data may be TOF depth data. Data, in the TOF depth data, whose depth meets a threshold condition may be marked effective. The threshold condition may be that a depth meets a specific value range, for example, is greater than or less than a preset value.

A decoder 2 in the second-level network device may correct the depths of the second error region in the dense depth map based on the TOF data or the TOF data and the TOF determining data. Based on the TOF determining data, the second-level network device may correct only depths of a second error region corresponding to effective TOF depth data, and does not correct depths of a second error region corresponding to ineffective TOF depth data.

Blurring processing is performed, based on the fused depth map, on a main image collected by a main image collection unit in a binocular system, to obtain a blurring result map.

In the foregoing method, the dense depth map of the binocular system is first calculated, and then the final fused depth map is obtained by performing optimization by using the CNN network. Because the CNN network can calculate and optimize the depth map end to end, a rectified main image, a rectified secondary image, and a TOF depth map may be used as input to obtain the final fused depth map by using the CNN network.

Figure 17:
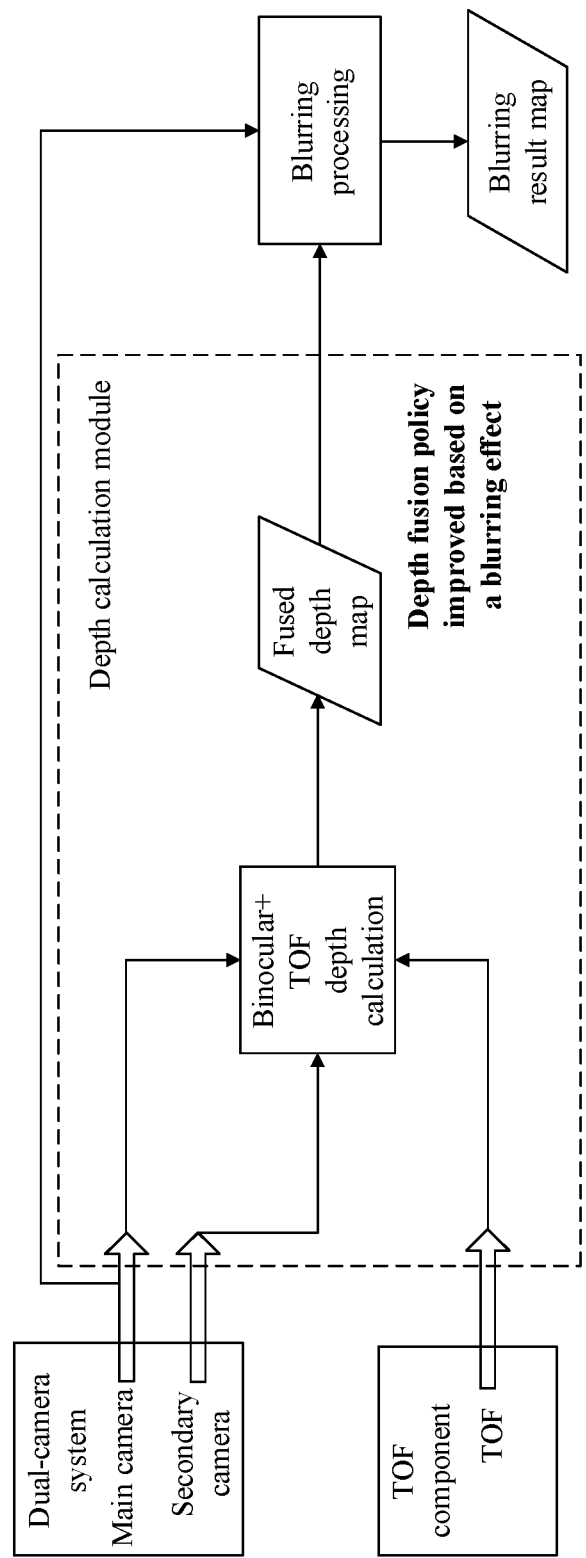
FIG. 17 is a schematic flowchart of an image processing method according to still another embodiment of this application.

FIG. 17 is a schematic flowchart of an image processing method according to an embodiment of this application.

Depth calculation is performed based on binocular image data and TOF data, to determine a fused depth map.

Blurring processing is performed, based on the fused depth map, on a main image collected by a main image collection unit in a binocular system, to obtain a blurring result map.

Figure 18:
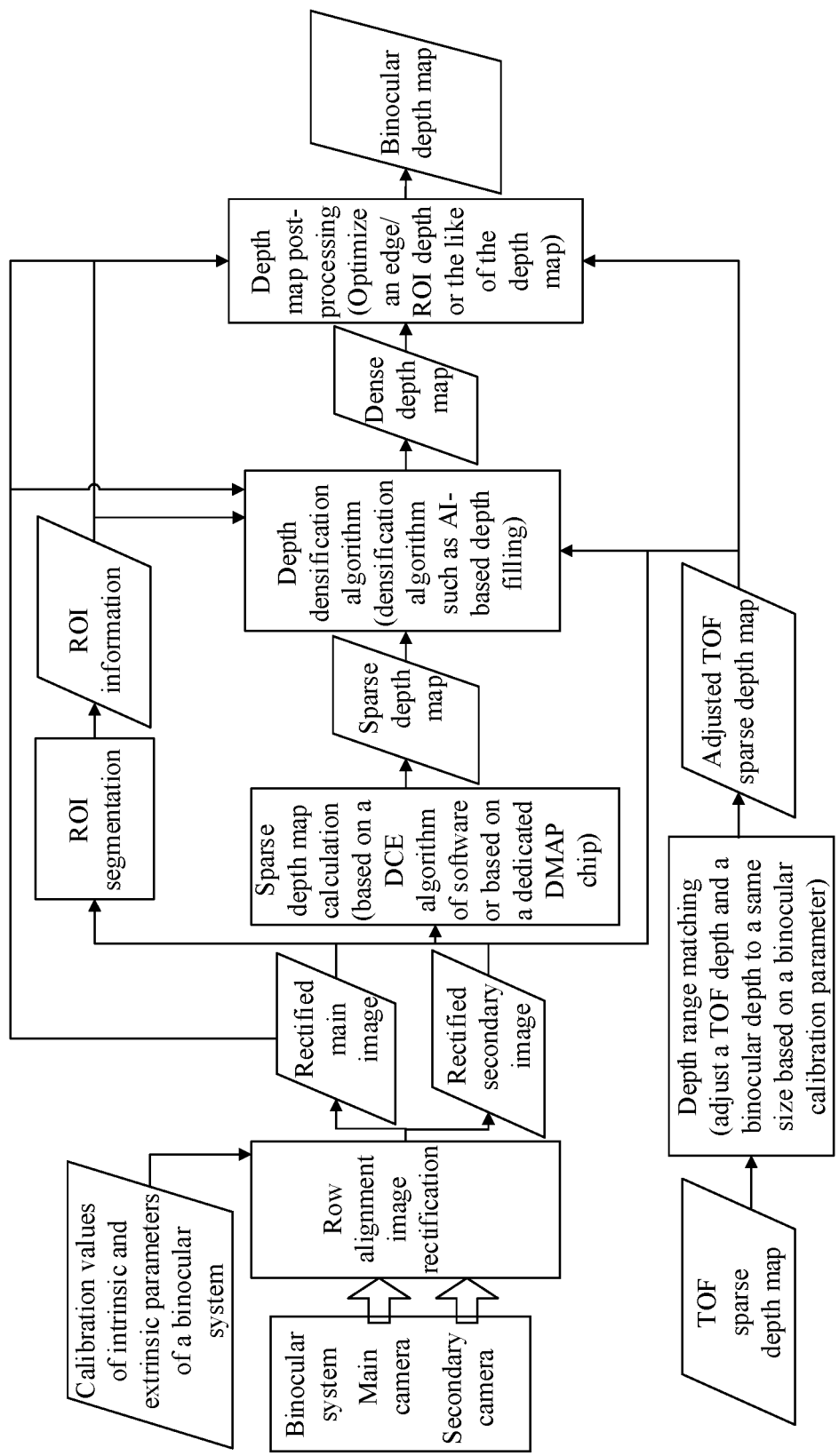
FIG. 18 is a schematic flowchart of an image processing method according to still another embodiment of this application.

FIG. 18 is a schematic flowchart of an image processing method according to an embodiment of this application. Fused depth map obtaining may mainly include four operations: image rectification, sparse depth map calculation, dense depth map calculation, and post-processing.

Both binocular data and TOF data are input to a depth calculation module. The depth calculation module performs optimization calculation based on input three pieces of data, to generate a depth map that meets a requirement and finally input a high-quality blurring result map.

Image rectification rectifies an input binocular image by using preset intrinsic and extrinsic parameters of a binocular system, to obtain an image after row alignment rectification. Row alignment image calibration is performed on binocular data collected by the binocular system based on calibration values of intrinsic and extrinsic parameters of the binocular system, to obtain a rectified main image and a rectified secondary image.

An ROI region may be determined by performing ROI segmentation based on the rectified main image and the rectified secondary image.

A binocular sparse depth map may be further determined based on the rectified main image and the rectified secondary image. The binocular sparse depth map may be obtained through sparse depth map calculation. The sparse depth map calculation may be performed in a plurality of manners that are existing or may occur in the future. The sparse depth map calculation may be performed based on software executing a DCE algorithm, or may be performed based on a depth calculation hardware chip such as a DMAP chip. The binocular sparse depth map based on a main image may be obtained by performing sparse depth map calculation on the rectified main image and the rectified secondary image.

After the ROI region and sparse depth map data are determined, a dense depth map may be determined based on the rectified main image, the rectified secondary image, the ROI region, the sparse depth map, and a TOF depth map.

Because of a difference in measurement methods and principles, there may be a specific system difference between depths obtained based on the binocular depth map and TOF, for example, a difference in a location or a difference in depths of each object in a scene in a picture. The system error is caused by a system difference in collection and calculation processes of the binocular depth map and the TOF depth map.

Coordinate alignment may be performed on a TOF sparse depth map and the binocular depth map to obtain an adjusted TOF sparse depth map. The TOF sparse depth map and the binocular depth map may be matched through offline calibration, online calibration, or the like, in other words, coordinate alignment may be performed. The coordinate alignment may be row alignment and/or column alignment. For example, a difference matching parameter of the TOF sparse depth map and the binocular depth map is obtained through offline calibration, so that TOF depth values are matched in the binocular depth map.

Depths of the TOF data may be adjusted, so that a depth error between the TOF data and binocular depth data that is caused by a system is reduced or even eliminated. The depths of the TOF data are adjusted, so that a system depth error between the TOF data and the binocular depth data is less than or equal to a preset value. The system depth error is caused by a difference between calculation principles of the TOF data and the binocular depth data.

The dense depth map may be obtained by using a depth densification algorithm. The dense depth map is obtained based on the rectified main image, the rectified secondary image, the binocular sparse depth map, the adjusted TOF sparse depth map, and the like. The depth densification algorithm may be, for example, a densification algorithm such as an AI-based depth filling algorithm. In a process of determining the dense depth map, depths of a first error region in the binocular depth map are corrected based on the TOF data. The binocular depth map may be a sparse depth map, or may be a binocular dense depth map. For example, the binocular dense depth map may be determined based on the rectified main image, the rectified secondary image, the ROI region, and the sparse depth map. The first error region may include at least one of the following regions in first image data: a repeated texture region, a region whose color difference is less than a preset value, or a depth gradient region. The depth gradient region may be a portrait region. The portrait region in the main image may be determined based on the rectified main image. The portrait region may be determined based on RGB features in the main image.

In an embodiment, in the depth densification algorithm, different parameters may be used for calculation inside and outside the ROI region. For example, a calculation parameter inside the ROI region may enable a depth calculation result inside the ROI region to be smoother. For example, depth values of one or more depth jumping points in the ROI region may be removed. A depth jump may be a depth exception point. The first error region in the main image may be determined by using texture information in the main image, and depth values corresponding to the first error region are corrected by using the TOF data. Depth values of the portrait region may be corrected by using the TOF data.

The dense depth map may be post-processed. Based on information such as the main image or the rectified main image, the ROI region, and the dense depth map, an edge of the ROI region in the dense depth map and a depth jumping region are optimized, and an obvious depth error is corrected to determine a final binocular depth map.

Blurring processing is performed, based on a fused depth map, on the main image collected by a main image collection unit in the binocular system, to obtain a blurring result map.

Figure 19:
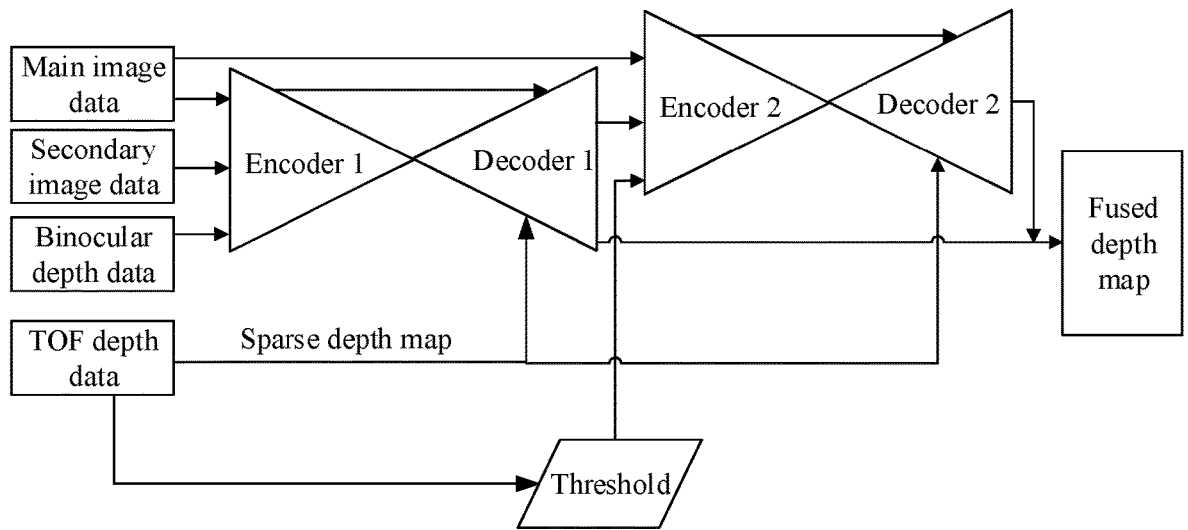
FIG. 19 is a schematic flowchart of an image processing method according to still another embodiment of this application.

FIG. 19 is a schematic flowchart of an image processing method according to an embodiment of this application.

A first-level network device may determine a first corrected dense depth map based on binocular data, a sparse depth map determined by using the binocular data, and TOF depth data. The first-level network device may determine the first corrected dense depth map based on an AI-based densification algorithm. The first-level network device may be a CNN network device, or may be another artificial intelligence (artificial intelligence, AI) network.

The first-level network device may determine a first error region based on the binocular data and the sparse depth map. The first error region may be an error-prone region in a depth map calculated by using the binocular data, for example, may be a repeated texture region, a region whose color difference is less than a preset value, or a depth gradient region.

The first-level network device may correct the first error region in sparse depth data based on the TOF data, to determine corrected dense depth data.

In this embodiment of this application, a manner in which the first-level network device corrects the first error region in the sparse depth data based on the TOF data to determine the corrected dense depth data is not limited.

In some embodiments, the first-level network device may determine dense depth data of a region other than the first error region based on the binocular data or based on the binocular data and the sparse depth map. The first-level network device may determine dense depth data of the first error region based on the TOF data and the binocular data or based on the TOF data, the binocular data, and the sparse depth map. The corrected dense depth data may include the dense depth data of the region other than the first error region and the dense depth data of the first error region.

In some embodiments, the first-level network device may correct depths of the first error region in the sparse depth map based on the TOF data, to obtain a corrected sparse depth map. The first-level network device may determine the corrected dense depth data based on the corrected sparse depth map and the binocular data.

The corrected dense depth data may be used as a fused depth map. The fusion depth map may be alternatively obtained after a second-level network device corrects the corrected dense depth data.

The second-level network device may determine a second dense depth map based on the corrected dense depth map, main image data, and the TOF depth data. The second-level network device may correct depths of a second error region in the corrected dense depth map to determine a final fused depth map. The second-level network device may be an encoder-decoder network, or may be a network of another structure. The second-level network device may be a CNN network device, or may be another AI network. The final fused depth map may be a dense depth map.

The second-level network device may determine the second error region, for example, may determine the second error region based on the main image data, the corrected dense depth map, and TOF determining data. The second error region may be an object edge region in the main image data, for example, may be a depth jumping region in the corrected dense depth map. Correcting the depths of the second error region may be used to improve precision of depths of the object edge region in the main image data, or may be used to remove an incorrect depth jump.

A decoder 2 in the second-level network device may correct the depths of the second error region in the corrected dense depth map based on the TOF data and/or the TOF determining data. Based on the TOF determining data, the second-level network device may correct only depths of a second error region corresponding to effective TOF depth data, and does not correct depths of a second error region corresponding to ineffective TOF depth data.

It may be determined, through threshold determining, whether TOF data is effective, to remove a possible exception point in the TOF data. The exception point may include a depth error jumping point and/or a point without data. The TOF determining data may be effective TOF depth data, or may be an identifier, for example, "0" or "1", indicating whether TOF depth data is effective. A form of the TOF determining data is not limited in this embodiment of this application. The TOF data may be TOF depth data. Data, in the TOF depth data, whose depth meets a threshold condition may be marked effective. The threshold condition may be that a depth meets a specific value range, for example, is greater than or less than a preset value.

Blurring processing is performed, based on the fused depth map, on a main image collected by a main image collection unit in a binocular system, to obtain a blurring result map.

The foregoing describes the method embodiments in the embodiments of this application with reference to FIG. 1 to FIG. 19. The following describes apparatus embodiments in the embodiments of this application with reference to FIG. 20 to FIG. 22. It should be understood that descriptions of the method embodiments correspond to descriptions of the apparatus embodiments. Therefore, for parts that are not described in detail, refer to the foregoing method embodiments.

Figure 20:
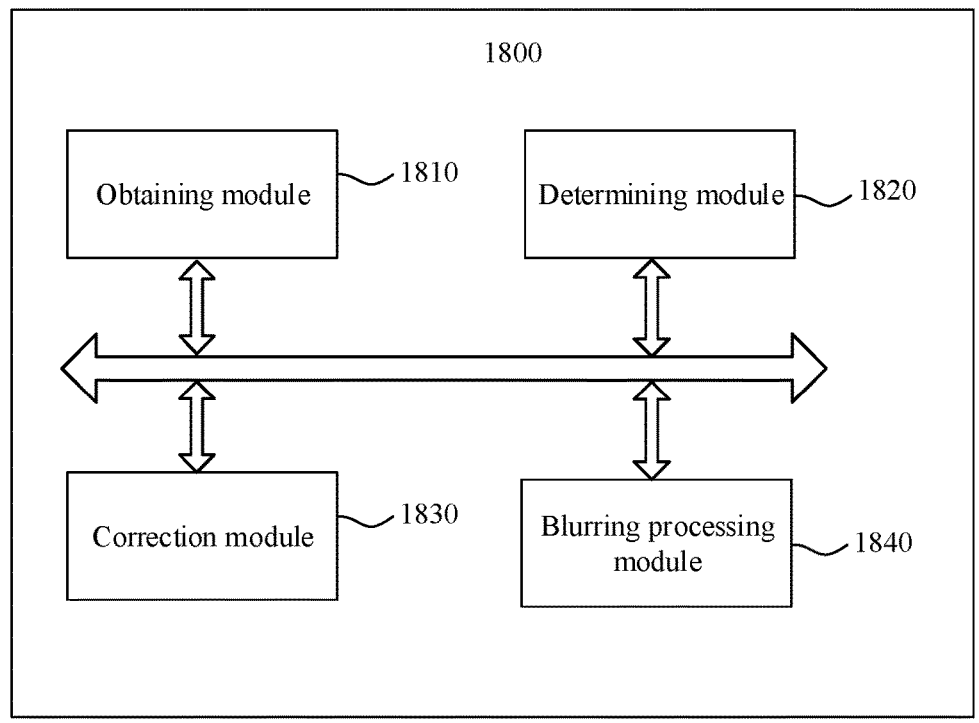
FIG. 20 is a schematic structural diagram of an image processing apparatus according to an embodiment of this application.

FIG. 20 shows an image processing apparatus 1800 according to an embodiment of this application. The apparatus 1800 includes:

an obtaining module 1810, configured to obtain binocular image data of a scene and time of flight (TOF) data of the scene, where the binocular image data includes first image data and second image data that are obtained by different cameras;

a determining module 1820, configured to determine an error region based on the binocular image data and binocular depth data, where the binocular depth data is determined based on the binocular image data;

a correction module 1830, configured to correct depths of the error region based on the TOF data, to determine corrected binocular depth data of the scene; and a blurring processing module 1840, configured to perform blurring processing on the first image data based on the corrected binocular depth data, where the first image data is to-be-displayed image data.

In an embodiment, the error region includes a first error region, and the binocular depth data includes binocular dense depth data.

Specifically, the determining module 1820 is configured to determine, based on the binocular depth data and the first image data or the second image data, a region that is of the first image data and that corresponds to a region, in the binocular depth data, whose at least one of precision or stability does not fall within a preset range;

the determining module 1820 is configured to determine the first error region based on the binocular dense depth data and the first image data; and the correction module 1830 is configured to correct depths of the first error region based on the TOF data and the binocular dense depth data, to determine the corrected binocular depth data.

In an embodiment, the correction module 1830 is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the corrected binocular depth data.

In an embodiment, the error region includes a first error region and a second error region, and the binocular depth data includes binocular dense depth data;

the determining module 1820 is configured to determine the first error region based on the binocular dense depth data and the first image data;

the correction module 1830 is configured to correct depths of the first error region based on the TOF data and the binocular dense depth data, to determine first corrected dense depth data;

the determining module 1820 is further configured to determine the second error region based on the first corrected dense depth data, the TOF data, and the first image data; and the correction module 1830 is further configured to correct depths of the second error region based on the TOF data and the first corrected dense depth data, to determine the corrected binocular depth data.

In an embodiment, the correction module 1830 is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the first corrected dense depth data.

In an embodiment, the error region includes a first error region, and the binocular depth data includes binocular sparse depth data;

the determining module 1820 is configured to determine a first error region based on the binocular sparse depth data, the first image data, and the second image data; and the correction module 1830 is configured to correct depths of the first error region based on the TOF data and the binocular sparse depth data, to determine the corrected binocular depth data.

In an embodiment, the correction module 1830 is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the corrected binocular depth data.

In an embodiment, the error region includes a first error region and a second error region, and the binocular depth data includes binocular sparse depth data;

the determining module 1820 is configured to determine the first error region based on the binocular sparse depth data, the first image data, and the second image data;

the correction module 1830 is configured to correct depths of the first error region based on the TOF data and the binocular sparse depth data, to determine first corrected dense depth data;

the determining module 1820 is further configured to determine the second error region based on the first corrected dense depth data, the TOF data, and the first image data; and the correction module 1830 is further configured to correct depths of the second error region based on the TOF data and the first corrected dense depth data, to determine the corrected binocular depth data.

In an embodiment, the correction module 1830 is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the first corrected dense depth data.

In an embodiment, the correction module 1830 is configured to: use, as the depths of the second error region, depths that are of the second error region and that correspond to the TOF data; perform densification processing on the depths of the second error region; and use, as corresponding depths of a region other than the second error region, depths that are of the region other than the second error region and that correspond to the first corrected dense depth data, to obtain the corrected binocular depth data.

In an embodiment, the second error region includes a depth jumping region in the first corrected dense depth data.

In an embodiment, the first error region includes at least one of the following regions: a repeated texture region, a region whose color difference is less than a first preset value, or a depth gradient region.

In an embodiment, the image processing apparatus 1800 further includes a first adjustment module, configured to: before the depths of the error region are corrected based on the TOF data, to determine the corrected binocular depth data of the scene, adjust depths of the TOF data and/or the binocular depth data, so that a system depth error between the TOF data and the binocular data is less than a second preset value.

In an embodiment, the image processing apparatus 1800 further includes a second adjustment module, configured to: before the depths of the error region are corrected based on the TOF data, to determine the corrected binocular depth data of the scene, adjust relative locations or a relative location of the TOF data and/or the binocular depth data, so that a system location error between the TOF data and the binocular data is less than a third preset value.

Figure 21:
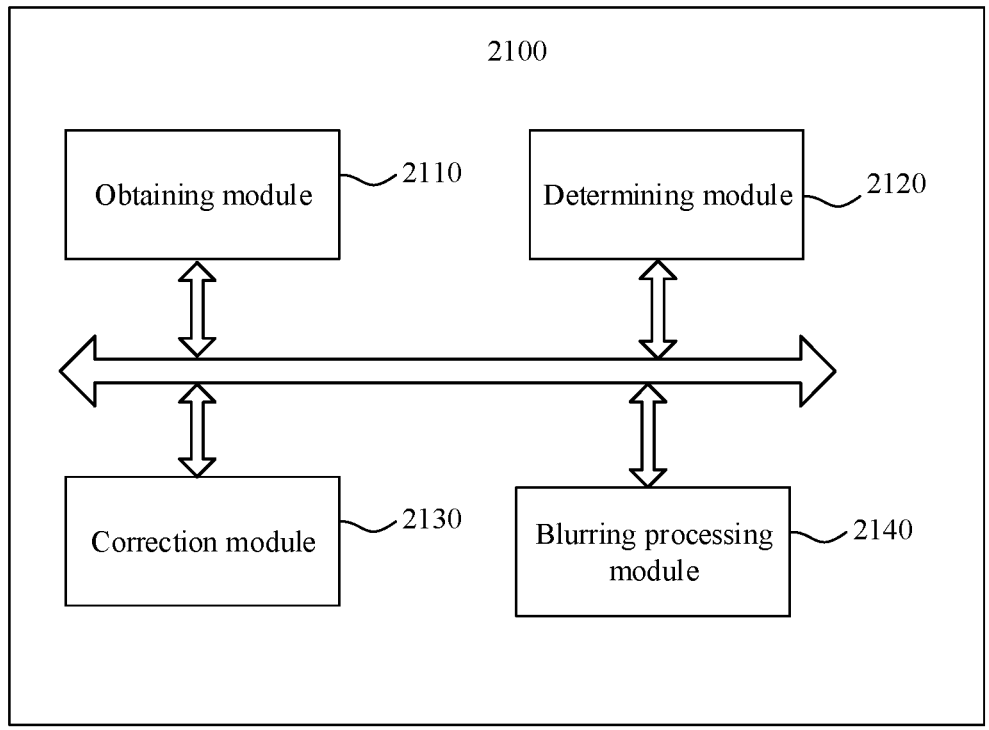
FIG. 21 is a schematic structural diagram of an image processing apparatus according to an embodiment of this application.

FIG. 21 shows an image processing apparatus 2100 according to an embodiment of this application. The apparatus 2100 includes:

an obtaining module 2110, configured to obtain binocular image data of a scene and time of flight (TOF) data of the scene, where the binocular image data includes a main image obtained by using a main camera;

a determining module 2120, configured to determine an error region in the main image based on the main image and a binocular depth map, where the binocular depth map is determined based on the binocular image data;

a correction module 2130, configured to correct, through a neural network by using depth values that are in a TOF depth map and that correspond to the error region, depth values that are in the binocular depth map and that correspond to the error region, to obtain a corrected binocular depth map, where the corrected binocular depth map includes depth values corresponding to the error region and depth values corresponding to another region, the another region is a region other than the error region in the main image, the depth values corresponding to the another region are obtained based on depth values that are in the binocular depth map and that correspond to the another region, and the TOF depth map is obtained based on the TOF data; and a blurring processing module 2140, configured to perform blurring processing on the main image based on the corrected binocular depth map.

In an embodiment, the error region includes a first error region and a second error region, the second error region is located outside the first error region and a portrait region, and the portrait region is obtained based on the main image;

the correction module 2130 is configured to correct, through a neural network by using depth values in the TOF depth map that correspond to the first error region and the portrait region, depth values in the binocular depth map that correspond to the first error region and the portrait region, to obtain a first corrected binocular depth map; and the correction module 2130 is configured to correct, through a neural network by using depth values that are in the TOF depth map and that correspond to the second error region, depth values that are in the first corrected binocular depth map and that correspond to the second error region, to obtain the corrected binocular depth map.

In an embodiment, the error region includes a first error region and a second error region, and the second error region is located outside the first error region;

the correction module 2130 is configured to correct, through a neural network by using depth values that are in the TOF depth map and that correspond to the first error region, depth values that are in the binocular depth map and that correspond to the first error region, to obtain a first corrected binocular depth map; and the correction module 2130 is configured to correct, through a neural network by using depth values that are in the TOF depth map and that correspond to the second error region, depth values that are in the first corrected binocular depth map and that correspond to the second error region, to obtain the corrected binocular depth map.

In an embodiment, the determining unit 2120 is configured to: determine a first error-prone region based on texture information in the main image, and determine the first error region from the first error-prone region based on the binocular depth map, where the error-prone region is in the binocular depth map, and differences between depth values of the first error region and depth values around the first error region are greater than or equal to a first preset value.

In an embodiment, the second error region includes a depth jumping region in the binocular depth map.

In an embodiment, the first error region includes at least one of the following regions: a repeated texture region or a region whose color difference is less than a first preset value.

In an embodiment, the apparatus 2100 further includes an adjustment module, configured to adjust depths of the TOF depth map and/or the binocular depth map, so that a system depth error between the TOF depth map and the binocular depth map is less than a second preset value.

In an embodiment, the adjustment module is configured to adjust relative locations or a relative location of the TOF depth map and/or the binocular depth map, so that a system location error between the TOF depth map and the binocular depth map is less than a third preset value.

Figure 22:
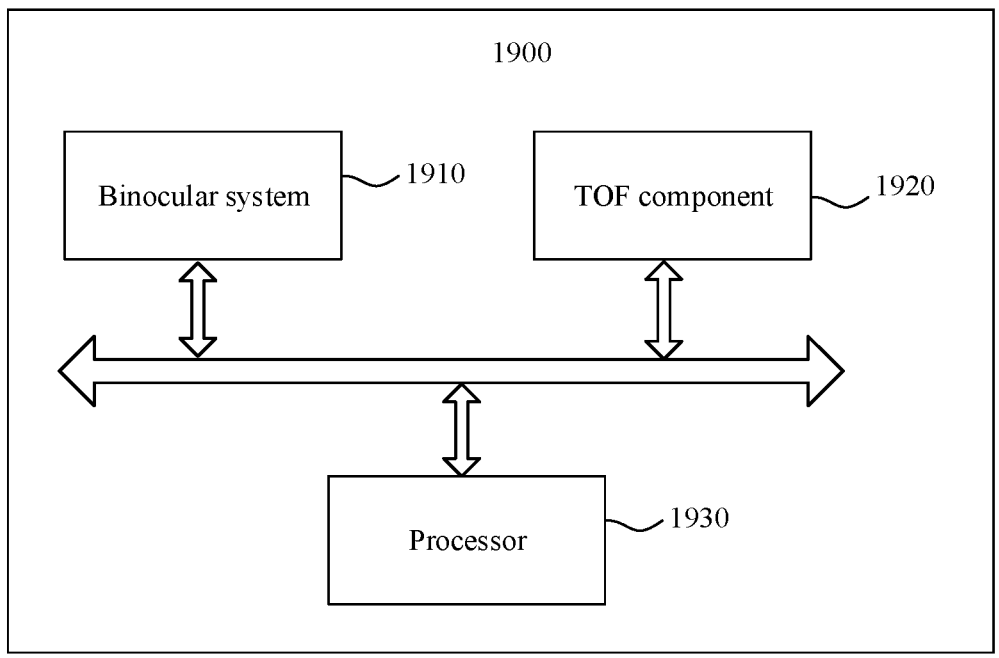
FIG. 22 is a schematic structural diagram of a terminal device according to an embodiment of this application.

FIG. 22 shows a terminal device 1900 according to an embodiment of this application. The terminal device 1900 includes:

a binocular system 1910, configured to collect binocular image data, where the binocular image data includes first image data and second image data;

a TOF component 1920, configured to collect TOF data; and a processor 1930, where when program instructions are executed by the at least one processor, the processor 1930 is configured to perform the following operations: determining an error region based on the binocular image data and binocular depth data, where the binocular depth data is determined based on the binocular image data; correcting depths of the error region based on the TOF data, to determine corrected binocular depth data of a scene; and performing blurring processing on the first image data based on the corrected binocular depth data.

In an embodiment, the processor 1930 may be further configured to obtain the binocular image data and the TOF data.

In an embodiment, the error region includes a first error region, and the binocular depth data includes binocular dense depth data; and the processor 1930 is configured to perform the following operations: determining the first error region based on the binocular dense depth data and the first image data; and correcting depths of the first error region based on the TOF data and the binocular dense depth data, to determine the corrected binocular depth data.

In an embodiment, the processor 1930 is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the corrected binocular depth data.

In an embodiment, the error region includes a first error region and a second error region, and the binocular depth data includes binocular dense depth data; and the processor 1930 is configured to perform the following operations: determining the first error region based on the binocular dense depth data and the first image data; correcting depths of the first error region based on the TOF data and the binocular dense depth data, to determine first corrected dense depth data; determining the second error region based on the first corrected dense depth data, the TOF data, and the first image data; and correcting depths of the second error region based on the TOF data and the first corrected dense depth data, to determine the corrected binocular depth data.

In an embodiment, the processor 1930 is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the first corrected dense depth data.

In an embodiment, the error region includes a first error region, and the binocular depth data includes binocular sparse depth data; and the processor 1930 is configured to perform the following operations: determining the first error region based on the binocular sparse depth data, the first image data, and the second image data; and correcting depths of the first error region based on the TOF data and the binocular sparse depth data, to determine the corrected binocular depth data.

In an embodiment, the processor 1930 is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the corrected binocular depth data.

In an embodiment, the error region includes a first error region and a second error region, and the binocular depth data includes binocular sparse depth data; and the processor 1930 is configured to perform the following operations: determining the first error region based on the binocular sparse depth data, the first image data, and the second image data; correcting depths of the first error region based on the TOF data and the binocular sparse depth data, to determine first corrected dense depth data; determining the second error region based on the first corrected dense depth data, the TOF data, and the first image data; and correcting depths of the second error region based on the TOF data and the first corrected dense depth data, to determine the corrected binocular depth data.

In an embodiment, the processor 1930 is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the first corrected dense depth data.

In an embodiment, the processor 1930 is configured to: use, as the depths of the second error region, depths that are of the second error region and that correspond to the TOF data; perform densification processing on the depths of the second error region; and use, as corresponding depths of a region other than the second error region, depths that are of the region other than the second error region and that correspond to the first corrected dense depth data, to obtain the corrected binocular depth data.

In an embodiment, the second error region includes a depth jumping region in the first corrected dense depth data.

In an embodiment, the first error region includes at least one of the following regions: a repeated texture region, a region whose color difference is less than a first preset value, or a depth gradient region.

In an embodiment, the processor 1930 is configured to: before the depths of the error region are corrected based on the TOF data, to determine the corrected binocular depth data of the scene, adjust depths of the TOF data and/or the binocular depth data, so that a system depth error between the TOF data and the binocular data is less than a second preset value.

In an embodiment, the processor 1930 is configured to: before the depths of the error region are corrected based on the TOF data, to determine the corrected binocular depth data of the scene, adjust relative locations or a relative location of the TOF data and/or the binocular depth data, so that a system location error between the TOF data and the binocular data is less than a third preset value.

An embodiment of this application further provides an image processing apparatus, including: an obtaining module, configured to obtain binocular image data of a scene and time of flight (TOF) data of the scene, where the binocular image data includes first image data and second image data that are obtained by different cameras; a correction module, configured to correct binocular depth data based on the TOF data, to obtain corrected binocular depth data, where the binocular depth data is determined based on the binocular image data; and a blurring processing module, configured to perform blurring processing on the first image data based on the corrected binocular depth data, where the first image data is to-be-displayed image data.

In an implementation, the correction module includes: a determining unit, configured to determine an error region based on the binocular image data and the binocular depth data; and a correction unit, configured to correct depths of the error region based on the TOF data, to determine the corrected binocular depth data.

In an implementation, the determining unit is configured to determine, based on the binocular depth data and the first image data or the second image data, a region that is of the first image data and that corresponds to a region, in the binocular depth data, whose at least one of precision or stability does not fall within a preset range.

In an implementation, the error region includes a first error region, and the binocular depth data includes binocular dense depth data; the determining unit is configured to determine the first error region based on the binocular dense depth data and the first image data, where the first error region is a region that is of the first image data and that corresponds to a region, in the binocular depth data, whose at least one of precision or stability does not fall within a preset range; and the correction unit is configured to correct depths of the first error region in the binocular dense depth data based on the TOF data, to determine the corrected binocular depth data.

In an implementation, the correction unit is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the corrected binocular depth data.

In an implementation, the error region includes a first error region and a second error region, the second error region includes a part of regions other than the first error region, and the binocular depth data includes binocular dense depth data; the determining unit is configured to determine the first error region based on the binocular dense depth data and the first image data, where the first error region is a region that is of the first image data and that corresponds to a region, in the binocular depth data, whose at least one of precision or stability does not fall within a preset range; the correction unit is configured to correct depths of the first error region in the binocular dense depth data based on the TOF data, to determine first corrected dense depth data; the determining unit is further configured to determine the second error region based on the first corrected dense depth data, the TOF data, and the first image data, where the second error region is a region that is of the first image data and that corresponds to a region, in the binocular depth data, whose at least one of precision or stability does not fall within a preset range; and the correction unit is further configured to correct depths of the second error region in the first corrected dense depth data based on the TOF data, to determine the corrected binocular depth data.

In an embodiment, the correction unit is configured to: use, as the depths of the first error region, depths that are of the first error region and that correspond to the TOF data; perform densification processing on the depths of the first error region; and use, as corresponding depths of a region other than the first error region, depths that are of the region other than the first error region and that correspond to the binocular dense depth data, to obtain the first corrected dense depth data.

In an embodiment, the error region includes a first error region, and the binocular depth data includes binocular sparse depth data; the determining unit is configured to determine the first error region based on the binocular sparse depth data, the first image data, and the second image data, where the first error region is a region that is of the first image data and that corresponds to a region, in the binocular depth data, whose at least one of precision or stability does not fall within a preset range; and the correction unit is configured to correct depths of the first error region in the binocular sparse depth data based on the TOF data, to determine the corrected binocular depth data.

In an embodiment, the correction unit is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the corrected binocular depth data.

In an embodiment, the error region includes a first error region and a second error region, the second error region includes a part of regions other than the first error region, and the binocular depth data includes binocular sparse depth data; the determining unit is configured to determine the first error region based on the binocular sparse depth data, the first image data, and the second image data, where the first error region is a region that is of the first image data and that corresponds to a region, in the binocular depth data, whose at least one of precision or stability does not fall within a preset range; the correction unit is configured to correct depths of the first error region in the binocular sparse depth data based on the TOF data, to determine first corrected dense depth data; the determining unit is further configured to determine the second error region based on the first corrected dense depth data, the TOF data, and the first image data, where the second error region is a region that is of the first image data and that corresponds to a region, in the binocular depth data, whose at least one of precision or stability does not fall within a preset range; and the correction unit is further configured to correct depths of the second error region in the first corrected dense depth data based on the TOF data, to determine the corrected binocular depth data.

In an embodiment, the correction unit is configured to: use, as the depths of the first error region, depths that are of the first error region and that correspond to the TOF data; use, as corresponding depths of a region other than the first error region, depths that are of the region other than the first error region and that correspond to the binocular sparse depth data; and perform densification processing on the depths of the first error region and the region other than the first error region, to obtain the first corrected dense depth data.

In an embodiment, the correction unit is configured to: use, as the depths of the second error region, depths that are of the second error region and that correspond to the TOF data; perform densification processing on the depths of the second error region; and use, as corresponding depths of a region other than the second error region, depths that are of the region other than the second error region and that correspond to the first corrected dense depth data, to obtain the corrected binocular depth data.

In an embodiment, the second error region includes a depth jumping region in the first corrected dense depth data.

In an embodiment, the first error region includes at least one of the following regions: a repeated texture region, a region whose color difference is less than a first preset value, or a depth gradient region.

In an embodiment, the apparatus further includes a first adjustment module, configured to: before the depths of the error region are corrected based on the TOF data, to determine the corrected binocular depth data, adjust depths of the TOF data and/or the binocular depth data, so that a system depth error between the TOF data and the binocular data is less than a second preset value.

In an embodiment, the apparatus further includes a second adjustment module, configured to: before the depths of the error region are corrected based on the TOF data, to determine the corrected binocular depth data, adjust relative locations or a relative location of the TOF data and/or the binocular depth data, so that a system location error between the TOF data and the binocular data is less than a third preset value.

An embodiment of this application further provides an image processing apparatus, including: a memory, configured to store code; and a processor, configured to read code in the memory to perform the foregoing method.

An embodiment of this application further provides a computer program storage medium, where the computer program storage medium includes program instructions, and when the program instructions are executed, the foregoing method is performed.

An embodiment of this application further provides a chip system, where the chip system includes at least one processor, and when program instructions are executed by the at least one processor, the foregoing method is performed.

A person of ordinary skill in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following" or a similar expression thereof indicates any combination of the items, including any combination of one or more of the items. For example, at least one of a, b, and c may indicate: a, b, c, a and b, a and c, b and c, or a, b, and c, where a, b, and c may be singular or plural. It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An image processing device, comprising:
    a binocular system comprising a first camera and a second camera;
    a time of flight (TOF) component configured to collect TOF depth data of a scene based on a time difference between laser emission and reception;
    one or more processors in communication with the binocular system; and
    a non-transitory memory storage comprising instructions stored therein, which when executed by the one or more processors, cause the image processing device to perform operations, the operations comprising:
        obtaining first image data of the scene via the first camera;
        obtaining second image data of the scene via the second camera;
        obtaining binocular depth data of the scene based on the first image data and the second image data;
        correcting the binocular depth data based on the TOF depth data by using a first neural network, to obtain corrected binocular depth data, wherein the correcting the binocular depth data based on the TOF depth data by using the first neural network comprises:
            correcting, using the first neural network, depth data in a first region of interest (ROI) of the binocular depth data, based on depth data in a second ROI of the TOF depth data corresponding to the first ROI of the binocular depth data, wherein the first ROI is determined based on the first image data; and
        performing blurring processing on the first image data based on the corrected binocular depth data and the first neural network.

2. The image processing device of claim 1, wherein the first ROI comprises a portrait region.

3. The image processing device of claim 1, wherein the first ROI is further determined based on the binocular depth data.

4. The image processing device of claim 3, wherein the first ROI comprises at least one of a repeated texture region or a weak texture region.

5. The image processing device of claim 1, wherein the binocular depth data comprises binocular dense depth data or binocular sparse depth data.

6. The image processing device of claim 1, wherein the first neural network is a convolutional neural network (CNN).

7. An image processing device, comprising:
    a binocular system comprising a first camera and a second camera;
    a time of flight (TOF) component configured to collect TOF depth data of a scene based on a time difference between laser emission and reception;
    one or more processors in communication with the binocular system; and
    a non-transitory memory storage comprising instructions stored therein, which when executed by the one or more processors, cause the image processing device to perform operations, the operations comprising:
        obtaining first image data of the scene via the first camera;

obtaining second image data of the scene via the second camera;

obtaining binocular depth data of the scene based on the first image data and the second image data;

correcting the binocular depth data based on the TOF depth data by using a first neural network, to obtain corrected binocular depth data, wherein the correcting the binocular depth data based on the TOF depth data by using the first neural network comprises:

correcting, using the first neural network, depth data in a first region of interest (ROI) of the binocular depth data, based on depth data in a second ROI of the TOF depth data corresponding to the first ROI of the binocular depth data, wherein the first ROI is determined based on the second image data and the binocular depth data; and performing blurring processing on the first image data based on the corrected binocular depth data and the first neural network.

8. The image processing device of claim 7, wherein the first ROI comprises at least one of a repeated texture region or a weak texture region.

9. A non-transitory computer-readable media storing computer instructions for image processing, which when executed by one or more processors, cause the one or more processors to perform operations, the operations comprising:

collecting time of flight (TOF) depth data of a scene based on a time difference between laser emission and reception;

obtaining first image data of the scene via a first camera;

obtaining second image data of the scene via a second camera;

obtaining binocular depth data of the scene based on the first image data and the second image data;

correcting the binocular depth data based on the TOF depth data by using a first neural network, to obtain corrected binocular depth data, wherein the correcting the binocular depth data based on the TOF depth data by using the first neural network comprises:

correcting, using the first neural network, depth data in a first region of interest (ROI) of the binocular depth data, based on depth data in a second ROI of the TOF depth data corresponding to the first ROI of the binocular depth data, wherein the first ROI is determined based on the first image data; and performing blurring processing on the first image data based on the corrected binocular depth data and the first neural network.

10. An image processing method, comprising:

collecting time of flight (TOF) depth data of a scene based on a time difference between laser emission and reception;

obtaining first image data of the scene via a first camera;

obtaining second image data of the scene via a second camera;

obtaining binocular depth data of the scene based on the first image data and the second image data;

correcting the binocular depth data based on the TOF depth data by using a first neural network, to obtain corrected binocular depth data, wherein the correcting the binocular depth data based on the TOF depth data by using the first neural network comprises:

correcting, using the first neural network, depth data in a first region of interest (ROI) of the binocular depth data, based on depth data in a second ROI of the TOF depth data corresponding to the first ROI of the binocular depth data, wherein the first ROI is determined based on the first image data; and performing blurring processing on the first image data based on the corrected binocular depth data and the first neural network.

11. The image processing method of claim 10, wherein the first neural network is a convolutional neural network (CNN).

12. The image processing method of claim 10, wherein the first ROI comprises a portrait region.

13. The image processing method of claim 10, wherein the first ROI is determined further based on the binocular depth data.

14. The non-transitory computer-readable media of claim 9, wherein the first ROI is determined further based on the binocular depth data.

15. The non-transitory computer-readable media of claim 9, wherein the first neural network is a convolutional neural network (CNN).

16. An image processing method, comprising:

collecting time of flight (TOF) depth data of a scene based on a time difference between laser emission and reception;

obtaining first image data of the scene via a first camera;

obtaining second image data of the scene via a second camera;

obtaining binocular depth data of the scene based on the first image data and the second image data;

correcting the binocular depth data based on the TOF depth data by using a first neural network, to obtain corrected binocular depth data, wherein the correcting the binocular depth data based on the TOF depth data by using the first neural network comprises:

correcting, using the first neural network, depth data in a first region of interest (ROI) of the binocular depth data, based on depth data in a second ROI of the TOF depth data corresponding to the first ROI of the binocular depth data, wherein the first ROI is determined based on the second image data and the binocular depth data; and performing blurring processing on the first image data based on the corrected binocular depth data and the first neural network.

* * * * *